United States Patent
Miyazawa et al.

(10) Patent No.: US 10,177,695 B2
(45) Date of Patent: Jan. 8, 2019

(54) MOTOR CONTROL APPARATUS AND CONTROL METHOD FOR MOTOR CONTROL APPARATUS

(71) Applicant: CANON KABUSHIKI KAISHA, Tokyo (JP)

(72) Inventors: Toru Miyazawa, Nagareyama (JP); Masahiko Mizoguchi, Kawasaki (JP); Kota Kiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/627,094

(22) Filed: Jun. 19, 2017

(65) Prior Publication Data
US 2017/0373618 A1    Dec. 28, 2017

(30) Foreign Application Priority Data
Jun. 24, 2016  (JP) .................................. 2016-125441

(51) Int. Cl.
*H02P 6/182* (2016.01)
*H02P 6/28* (2016.01)
*H02P 21/22* (2016.01)

(52) U.S. Cl.
CPC .............. *H02P 6/182* (2013.01); *H02P 6/28* (2016.02); *H02P 21/22* (2016.02)

(58) Field of Classification Search
None
See application file for complete search history.

(56) References Cited

U.S. PATENT DOCUMENTS

| | | | | |
|---|---|---|---|---|
| 2003/0128009 A1* | 7/2003 | Sakurai | ..................... | H02P 6/18 318/722 |
| 2007/0013333 A1* | 1/2007 | Ajima | ....................... | H02P 6/18 318/432 |
| 2008/0197799 A1* | 8/2008 | Tomigashi | ................ | H02P 6/18 318/768 |

(Continued)

FOREIGN PATENT DOCUMENTS

| | | |
|---|---|---|
| JP | 4154149 B2 | 9/2008 |
| JP | 4631672 B2 | 2/2011 |
| JP | 5170505 B2 | 3/2013 |

*Primary Examiner* — Bentsu Ro
(74) *Attorney, Agent, or Firm* — Canon U.S.A., Inc. IP Division

(57) ABSTRACT

A position estimation unit of a motor control apparatus includes a counter electromotive voltage estimation unit configured to estimate a counter electromotive voltage generated in a motor based on generated voltage and current of the motor, and an arc tangent calculation unit configured to perform an arc tangent calculation using coordinate data on a two-dimensional plane based on the estimated counter electromotive voltage to calculate an angle of deviation. The arc tangent calculation unit includes a rotation calculation unit configured to repeatedly perform a rotation calculation of coordinate data on a fundamental wave and a harmonic; a rotation direction judgment unit configured to judge a rotation direction of a subsequent rotation calculation based on a result of the rotation calculation of the rotation calculation unit; and a deviation angle calculation unit configured to calculate a total of rotation angles obtained as a result of the rotation calculation.

14 Claims, 22 Drawing Sheets

(56) References Cited

U.S. PATENT DOCUMENTS

2009/0289587 A1* 11/2009 Baba .................. H02P 6/18
                                              318/400.11
2013/0069572 A1*  3/2013 Maekawa ............ H02P 6/18
                                              318/400.14

* cited by examiner

FIG. 8

| ORDER | FUNDAMENTAL WAVE | THIRD-ORDER HARMONIC FIRST TERM | THIRD-ORDER HARMONIC SECOND TERM |
|---|---|---|---|
| ROTATION CALCULATION REFERENCE DIRECTION $\delta_{def}$ | −1 (RIGHT) | 1 (LEFT) | 1 (LEFT) |
| ELEMENTS OF ROTATION DIRECTION DISCRIMINANT | +Yout | −Yout | −Xout |

FIG. 15

| | | FUNDAMENTAL WAVE | SECOND-ORDER HARMONIC FIRST TERM | SECOND-ORDER HARMONIC SECOND TERM | FIFTH-ORDER HARMONIC FIRST TERM | FIFTH-ORDER HARMONIC SECOND TERM | SEVENTH-ORDER HARMONIC FIRST TERM | SEVENTH-ORDER HARMONIC SECOND TERM |
|---|---|---|---|---|---|---|---|---|
| ROTATION CALCULATION REFERENCE DIRECTION $\delta_{def}$ | FIRST TO FOURTH QUADRANTS | −1 (RIGHT) | 1 (LEFT) | 1 (LEFT) | 1 (LEFT) | 1 (LEFT) | −1 (RIGHT) | −1 (RIGHT) |
| ELEMENTS OF ROTATION DIRECTION DISCRIMINANT | FIRST QUADRANT | +Yout | +Yout | −Xout | +Yout | −Xout | +Yout | +Xout |
| | SECOND QUADRANT | +Yout | −Xout | −Yout | −Yout | +Xout | −Yout | −Xout |
| | THIRD QUADRANT | +Yout | −Yout | +Xout | +Yout | −Xout | +Yout | +Xout |
| | FOURTH QUADRANT | +Yout | +Xout | +Yout | −Yout | +Xout | −Yout | −Xout |

FIG. 18

| ROTATION CALCULATION REFERENCE DIRECTION $\delta_{def}$ | EACH COMPONENT (FIRST TERM, SECOND TERM, SIGN, ORDER n) | | FIRST TERM | | | | SECOND TERM | | | |
|---|---|---|---|---|---|---|---|---|---|---|
| | | SIGN IN FORMULA X | + | − | + | − | + | + | − | − |
| | | SIGN IN FORMULA Y | + | + | − | − | + | − | + | − |
| | | FIRST TO FOURTH QUADRANTS | −1 (RIGHT) | +1 (LEFT) | +1 (LEFT) | −1 (RIGHT) | +1 (LEFT) | −1 (RIGHT) | −1 (RIGHT) | +1 (LEFT) |
| ELEMENTS OF ROTATION DIRECTION DISCRIMINANT | mod(n,4) = 1 | FIRST QUADRANT | +Yout | +Yout | −Yout | −Yout | −Xout | +Xout | −Xout | +Xout |
| | | SECOND QUADRANT | +Yout | −Yout | +Yout | −Yout | +Xout | +Xout | −Xout | −Xout |
| | | THIRD QUADRANT | +Yout | +Yout | −Yout | −Yout | +Xout | −Xout | +Xout | −Xout |
| | | FOURTH QUADRANT | +Yout | −Yout | +Yout | −Yout | −Xout | −Xout | +Xout | +Xout |
| | mod(n,4) = 2 | FIRST QUADRANT | −Xout | −Xout | +Xout | +Xout | −Yout | −Yout | +Yout | +Yout |
| | | SECOND QUADRANT | −Yout | −Yout | +Yout | +Yout | +Xout | −Xout | +Xout | −Xout |
| | | THIRD QUADRANT | +Xout | +Xout | −Xout | −Xout | +Yout | +Yout | −Yout | −Yout |
| | | FOURTH QUADRANT | +Yout | +Yout | −Yout | −Yout | −Xout | +Xout | −Xout | +Xout |
| | mod(n,4) = 3 | FIRST QUADRANT | −Yout | −Yout | +Yout | +Yout | +Xout | −Xout | +Xout | −Xout |
| | | SECOND QUADRANT | +Yout | −Yout | +Yout | −Yout | −Xout | −Xout | +Xout | +Xout |
| | | THIRD QUADRANT | −Yout | −Yout | +Yout | +Yout | −Xout | +Xout | −Xout | +Xout |
| | | FOURTH QUADRANT | +Yout | −Yout | +Yout | −Yout | +Xout | +Xout | −Xout | −Xout |
| | mod(n,4) = 0 | FIRST QUADRANT | +Xout | +Xout | −Xout | −Xout | +Yout | +Yout | −Yout | −Yout |
| | | SECOND QUADRANT | −Yout | +Yout | −Yout | +Yout | −Xout | +Xout | −Xout | +Xout |
| | | THIRD QUADRANT | −Xout | −Xout | +Xout | +Xout | −Yout | −Yout | +Yout | +Yout |
| | | FOURTH QUADRANT | −Xout | +Yout | −Xout | +Yout | +Yout | −Yout | +Yout | −Yout |

FIG. 20

| | | FUNDAMENTAL WAVE | SECOND-ORDER HARMONIC FIRST TERM | SECOND-ORDER HARMONIC SECOND TERM | FIFTH-ORDER HARMONIC FIRST TERM | FIFTH-ORDER HARMONIC SECOND TERM | SEVENTH-ORDER HARMONIC FIRST TERM | SEVENTH-ORDER HARMONIC SECOND TERM |
|---|---|---|---|---|---|---|---|---|
| ROTATION CALCULATION REFERENCE DIRECTION $\delta_{def}$ | FIRST TO FOURTH QUADRANTS | −1 (RIGHT) | 1 (LEFT) | 1 (LEFT) | 1 (LEFT) | 1 (LEFT) | −1 (RIGHT) | −1 (RIGHT) |
| ELEMENTS OF ROTATION DIRECTION DISCRIMINANT | FIRST QUADRANT | +Yout | +Yout | −Xout | +Yout | −Xout | +Yout | +Xout |
| | SECOND QUADRANT | +Yout | −Yout | −Xout | +Yout | +Xout | +Yout | −Xout |
| | THIRD QUADRANT | +Yout | −Yout | +Xout | +Yout | −Xout | +Yout | +Xout |
| | FOURTH QUADRANT | +Yout | +Yout | +Xout | +Yout | +Xout | +Yout | −Xout |

FIG. 21

| ROTATION CALCULATION REFERENCE DIRECTION δ_def | ELEMENTS OF ROTATION DIRECTION DISCRIMINANT | EACH COMPONENT (FIRST, SECOND TERM, SIGN, ORDER n) | FIRST TERM | | | | SECOND TERM | | | |
|---|---|---|---|---|---|---|---|---|---|---|
| | | SIGN IN FORMULA X | − | + | + | − | + | − | − | + |
| | | SIGN IN FORMULA Y | + | − | + | − | − | + | − | + |
| | | FIRST TO FOURTH QUADRANTS | −1 (RIGHT) | +1 (LEFT) | +1 (LEFT) | −1 (RIGHT) | +1 (LEFT) | −1 (RIGHT) | −1 (RIGHT) | +1 (LEFT) |
| | mod(n,4) = 1 | FIRST QUADRANT | +Yout | +Yout | −Yout | −Yout | −Xout | +Xout | +Xout | −Xout |
| | | SECOND QUADRANT | +Yout | +Yout | −Yout | −Yout | +Xout | −Xout | −Xout | +Xout |
| | | THIRD QUADRANT | +Yout | +Yout | −Yout | −Yout | −Xout | +Xout | +Xout | −Xout |
| | | FOURTH QUADRANT | +Yout | +Yout | −Yout | −Yout | +Xout | −Xout | −Xout | +Xout |
| | mod(n,4) = 2 | FIRST QUADRANT | −Yout | −Yout | +Yout | +Yout | −Xout | +Xout | +Xout | −Xout |
| | | SECOND QUADRANT | −Yout | −Yout | +Yout | +Yout | +Xout | −Xout | −Xout | +Xout |
| | | THIRD QUADRANT | −Yout | −Yout | +Yout | +Yout | −Xout | +Xout | +Xout | −Xout |
| | | FOURTH QUADRANT | +Yout | +Yout | −Yout | −Yout | +Xout | −Xout | −Xout | +Xout |
| | mod(n,4) = 3 | FIRST QUADRANT | +Yout | +Yout | −Yout | −Yout | +Xout | −Xout | −Xout | +Xout |
| | | SECOND QUADRANT | +Yout | +Yout | −Yout | −Yout | −Xout | +Xout | +Xout | −Xout |
| | | THIRD QUADRANT | +Yout | +Yout | −Yout | −Yout | +Xout | −Xout | −Xout | +Xout |
| | | FOURTH QUADRANT | +Yout | +Yout | −Yout | −Yout | −Xout | +Xout | +Xout | −Xout |
| | mod(n,4) = 0 | FIRST QUADRANT | −Yout | −Yout | +Yout | +Yout | +Xout | −Xout | −Xout | +Xout |
| | | SECOND QUADRANT | −Yout | −Yout | +Yout | +Yout | −Xout | +Xout | +Xout | −Xout |
| | | THIRD QUADRANT | −Yout | −Yout | +Yout | +Yout | +Xout | −Xout | −Xout | +Xout |
| | | FOURTH QUADRANT | +Yout | +Yout | −Yout | −Yout | −Xout | +Xout | +Xout | −Xout |

MOTOR CONTROL APPARATUS AND CONTROL METHOD FOR MOTOR CONTROL APPARATUS

BACKGROUND

Field of the Disclosure

The present disclosure generally relates to a motor control apparatus and a control method for a motor control apparatus.

Description of the Related Art

A permanent magnet motor which is excellent in miniaturization, high efficiency, and the like, is used for a driving part in various fields including an information apparatus field such as a printer and a copying machine. One example of a method for driving control of a permanent magnet motor, vector control is known. The use of the vector control enables more precise control of a torque generated in the motor. As a result, silence, low vibration, and high efficiency of the motor can be achieved. When the vector control is used for driving control of the permanent magnet motor, magnetic pole position information about a rotor of the motor is required. Accordingly, in general, a position sensor, such as a Hall element or an encoder, is required. The use of the position sensor causes an increase in cost and size.

In this regard, a sensorless method is proposed in which a magnetic pole position of a rotor is estimated from a current flowing through a permanent magnet motor without using a position sensor. There are various sensorless methods. One of the sensorless methods is a counter electromotive voltage estimation method for estimating a magnetic pole position of a rotor by estimating a counter electromotive voltage generated in association with the rotation of the rotor. The counter electromotive voltage estimation method uses the fact that the phase of the counter electromotive voltage corresponds to the magnetic pole position of the rotor, and obtains the counter electromotive voltage by calculation and calculates the phase of the counter electromotive voltage by an arc tangent (ATAN) calculation, thereby estimating the magnetic pole position of the rotor.

A CORDIC algorithm is known as arc tangent calculation method. The CORDIC algorithm is an iterative solving method capable of obtaining a solution to a trigonometric function or a multiplication or division by repeatedly rotating coordinates of two-dimensional coordinate data by treating an input signal as two-dimensional coordinate data. The magnetic pole position of the rotor can be estimated by obtaining the phase of the counter electromotive voltage using the arc tangent calculation method.

However, the counter electromotive voltage generated in the permanent magnet motor may include harmonic components in many cases, such as, when trapezoidal wave magnetization is a magnetization distribution of a permanent magnet to achieve a high efficiency, or when ideal sine wave magnetization is not obtained due to an error in production. An arc tangent calculation assumes that the counter electromotive voltage is an ideal sine wave including no harmonics. Accordingly, if the counter electromotive voltage includes harmonic components, an error occurs at an estimated position. When the error occurs at the estimated position, an error also occurs at an estimated speed obtained from the estimated position. Driving control of the motor based on the estimated position or estimated speed including an error leads to deterioration in efficiency, rotational unevenness, and an increase in vibration and noise.

To solve the above-mentioned problem, in Japanese Patent No. 5170505, an estimated position error due to harmonics is reduced by making a motor voltage or motor current to pass through a low-pass filter. The use of the low-pass filter enables removal of harmonic components from the motor voltage and motor current, obtainment of the counter electromotive voltage including no harmonic components, a reduction in estimated positional error.

In Japanese Patent No. 4154149, a table indicating counter electromotive voltage data on a permanent magnet motor is prepared and a voltage in which harmonic components of a counter electromotive voltage are taken into consideration is applied to a motor, thereby removing harmonics of a motor current. As a result of eliminating harmonics from the motor current, harmonic components included in an estimated counter electromotive voltage are reduced, thereby reducing estimated positional errors.

In Japanese Patent No. 4631672, harmonic components included in a motor driving current are extracted by a high-pass filter or the like, a correction amount of an estimated position is obtained from the extracted harmonic components and the estimated position is corrected, thereby reducing estimated positional errors due to harmonics.

However, the related art described above has problems as described below. In Japanese Patent No. 5170505, since the motor voltage and motor current used for estimating the magnetic pole position of the motor are allowed to pass through the low-pass filter, a phase delay occurs in the motor voltage and motor current and a delay occurs in the estimated position and estimated speed. If a delay occurs in the estimated speed, the responsiveness and stability of a speed control loop deteriorate when the speed of the motor is controlled using the estimated speed.

In Japanese Patent No. 4154149, the use of the data indicating the counter electromotive voltage data on the permanent magnet motor enables a reduction in errors in the estimated position and estimated speed without any phase delay. However, the counter electromotive voltage value corresponding to the resolution of the position is required, which causes a problem that a huge memory area for storing the counter electromotive voltage value is required along with an increase in resolution of the position.

In Japanese Patent No. 4631672, harmonic components included in the motor current are extracted by the high-pass filter and a correction amount is calculated, thereby avoiding the above-mentioned problems. However, when harmonic components are extracted, harmonics generated due to a counter electromotive voltage distortion and harmonics generated due to a variation in speed and a variation in load cannot be separated from each other. Therefore, an error is included in the calculated correction amount of the estimated position, which makes it difficult to accurately reduce the error. Further, when a high-pass filter is used as a harmonic extraction unit, it is difficult to eliminate effects due to a phase shift caused by the filter, so that an error occurs in the calculated correction amount.

SUMMARY

Aspects of the present disclosure provide a motor control apparatus and a control method for a motor control apparatus which are capable of reducing a memory area for a correction value and reducing an error in estimation of a position of a rotor.

According to one or more aspects of the present disclosure, a motor control apparatus includes: a motor including a rotor; a current detection unit configured to detect a current flowing through the motor; a position estimation unit configured to estimate a position of the rotor based on the current detected by the current detection unit; and a driving voltage generation unit configured to generate a voltage to be applied to the motor based on the position of the rotor estimated by the position estimation unit. The position estimation unit includes: a counter electromotive voltage estimation unit configured to estimate a counter electromotive voltage generated in the motor based on the voltage generated by the driving voltage generation unit and the current detected by the current detection unit; and an arc tangent calculation unit configured to calculate an angle of deviation by performing an arc tangent calculation using coordinate data on a two-dimensional plane based on the counter electromotive voltage estimated by the counter electromotive voltage estimation unit. The arc tangent calculation unit includes: a fundamental-wave rotation calculation unit configured to repeatedly perform a rotation calculation of coordinate data on a fundamental wave while decreasing a rotation angle; a harmonic rotation calculation unit configured to repeatedly perform a rotation calculation of coordinate data on at least one or more harmonics while decreasing the rotation angle; a rotation direction judgment unit configured to judge a rotation direction of a subsequent rotation calculation of each of the fundamental-wave rotation calculation unit and the harmonic rotation calculation unit based on a result of the rotation calculation of the fundamental-wave rotation calculation unit and a result of the rotation calculation of the harmonic rotation calculation unit; and an angle-of-deviation calculation unit configured to calculate, as an angle of deviation of the fundamental wave, a total of rotation angles calculated by the fundamental-wave rotation calculation unit.

Further features of the present disclosure will become apparent from the following description of exemplary embodiments (with reference to the attached drawings).

BRIEF DESCRIPTION OF THE DRAWINGS

FIG. 8 is a table illustrating rotation reference directions and elements of a rotation direction discriminant according to the first embodiment.

FIG. 15 is a table illustrating rotation reference directions and elements of a rotation direction discriminant according to the second embodiment.

FIG. 18 is a table illustrating rotation reference directions and elements of a rotation direction discriminant.

FIG. 20 is a table illustrating rotation reference directions and elements of a rotation direction discriminant according to a third embodiment.

FIG. 21 is a table illustrating rotation reference directions and elements of a rotation direction discriminant.

DESCRIPTION OF THE EMBODIMENTS

First Embodiment

Figure 1:
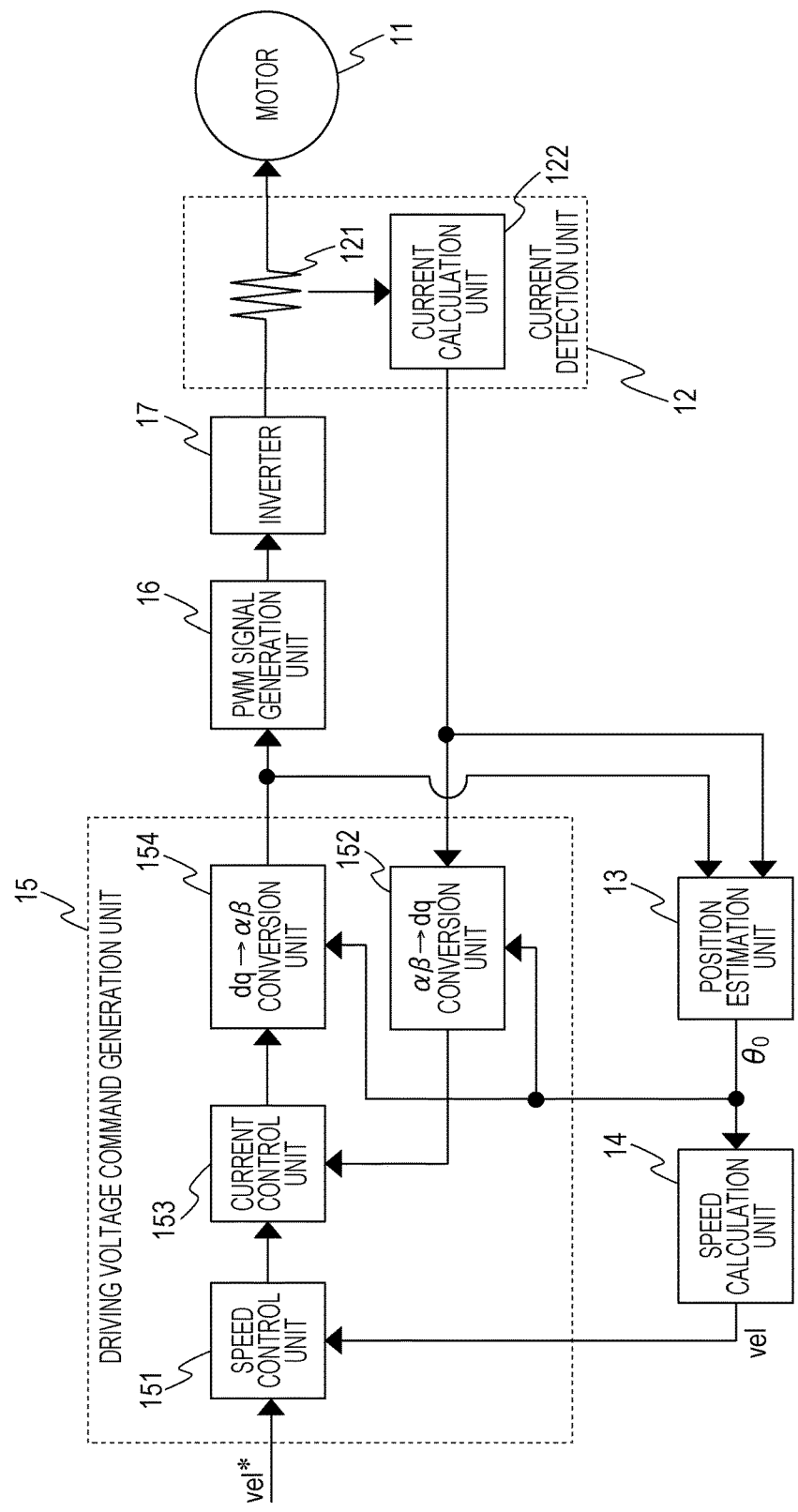
FIG. 1 is a diagram illustrating a schematic configuration of a motor control apparatus according to a first embodiment.
Figure 2:
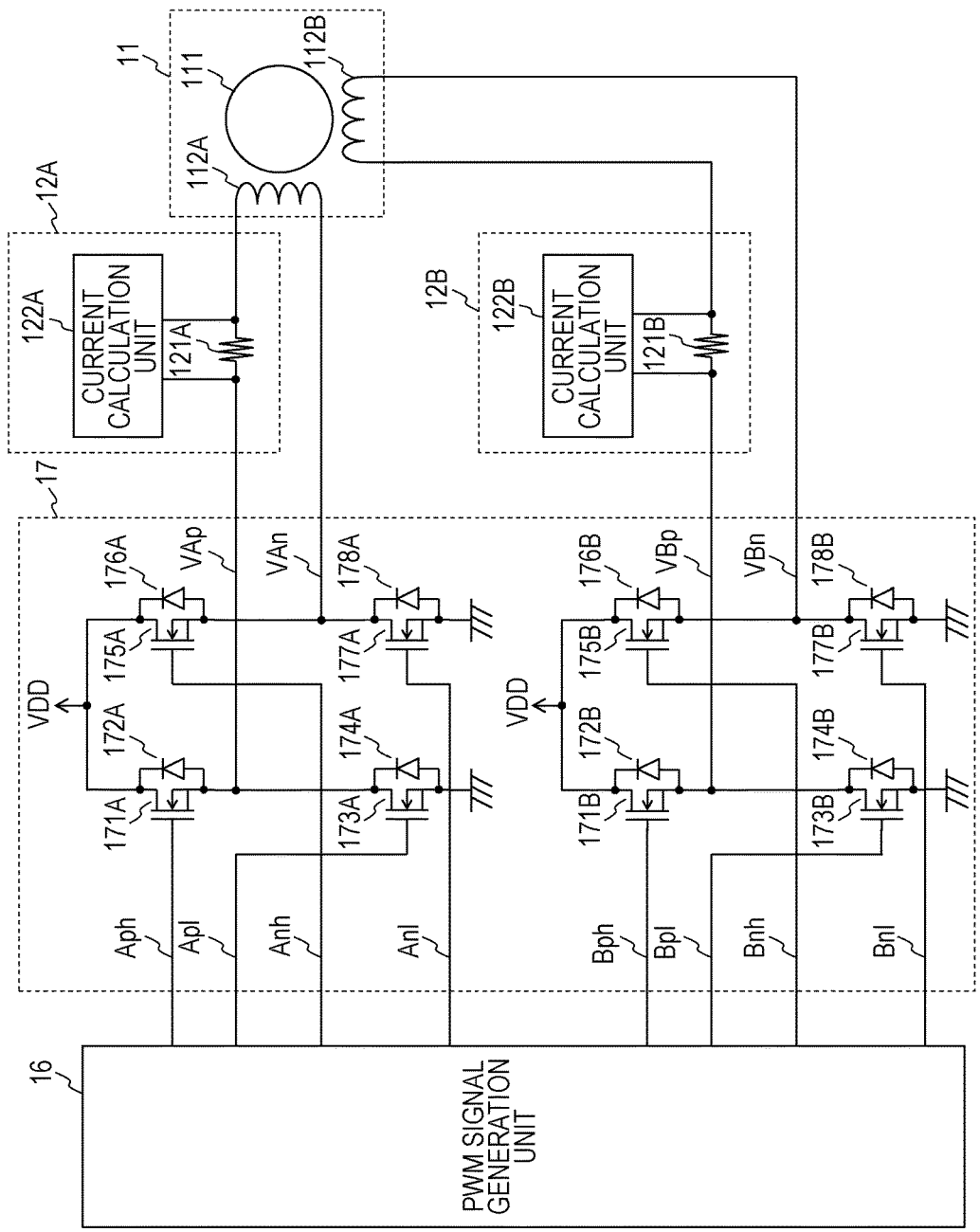
FIG. 2 is a diagram illustrating an electrical connection between an inverter and a motor according to the first embodiment.

A first embodiment of the present disclosure illustrates a case where a motor control apparatus is applied to a 2-phase stepping motor. Referring first to FIGS. 1 and 2, a basic configuration of a motor driving control apparatus according to this embodiment and a control method for the motor control apparatus will be described. FIG. 1 is a diagram illustrating a configuration example of the motor control apparatus according to the first embodiment of the present disclosure. FIG. 2 is a diagram illustrating an example of an electrical connection from an inverter to a motor. As illustrated in FIG. 1, the motor control apparatus includes a 2-phase stepping motor 11, a current detection unit 12, a position estimation unit 13, a speed calculation unit 14, a driving voltage command generation unit 15, a pulse width modulation (PWM) signal generation unit 16, and an inverter 17. The 2-phase stepping motor 11 includes a rotor 111 including a permanent magnet, and a stator including windings 112A and 112B which have two phases, i.e., an A-phase and a B-phase, respectively.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

As illustrated in FIG. 2, the current detection unit 12 includes current detection resistors 121A and 121B and current calculation units 122A and 122B which detect a current flowing through the A-phase winding 112A of the motor 11 and a current flowing through the B-phase winding 112B. The detected current flowing through the A-phase winding 112A is represented by $i_{\alpha\_det}$, the detected current flowing through the B-phase winding 112B is represented by $i_{\beta\_det}$. The current detection resistors 121A and 121B each have a resistance of 50 mΩ and are connected in series between the inverter 17 and the windings 112A and 112B. The current calculation units 122A and 122B measure a voltage at both ends of the current detection resistors 121A and 121B, and calculate a current flowing through the windings 112A and 112B from the measured voltage value and the resistance values of the current detection resistors 121A and 121B.

The position estimation unit 13 performs calculation based on a driving voltage command of the driving voltage command generation unit 15 and the current detected by the current detection unit 12, and estimates a magnetic pole position $\theta_0$ of the rotor 111 of the motor 11. The estimated magnetic pole position is represented by $\theta_0$. Details thereof will be described later. The speed calculation unit 14 calculates a rotational speed vel of the motor 11 based on the magnetic pole position $\theta_0$ of the motor 11 estimated by the position estimation unit 13. The speed calculation unit 14 obtains the amount of change of the magnetic pole position $\theta_0$ for a predetermined time, and estimates the speed vel by dividing the amount of change by the predetermined time.

The driving voltage command generation unit 15 includes a speed control unit 151, an αβ→dq conversion unit 152, a current control unit 153, and a dq→αβ conversion unit 154. The driving voltage command is generated based on the magnetic pole position $\theta_0$ input from the position estimation unit 13 and the estimated speed vel input from the speed calculation unit 14. The α β→dq conversion unit 152 and the dq→αβ conversion unit 154 are respectively converted to coordinate systems of an αβ coordinate system which is a fixed coordinate system and a dq coordinate system which is a rotation coordinate system. The dq coordinate system has an advantage that a voltage and current can be handled as the amount of direct current. The speed control unit 151 compares the speed vel calculated by the speed calculation unit 14 with a target speed command vel* input from a central processing unit (CPU), which may include one or more processors and one or more memories, and calculates a speed deviation which is a difference between them. Further, the speed control unit 151 performs a speed control operation of proportional-integral (PI) control on the speed deviation, outputs a q-axis current command Iq* which contributes to a torque generated in the motor, and outputs a d-axis current command Id*=0. As shown in Expression (1), the αβ→dq conversion unit 152 converts current detection values $i_{\alpha\_det}$ and $i_{\beta\_det}$ of the A-phase winding 112A and the B-phase winding 112B, which are input from the current detection unit 12, into current detection values $i_{d\_det}$ and $i_{q\_det}$ of the dq coordinate system.

$$\begin{pmatrix} i_{d\_det} \\ i_{q\_det} \end{pmatrix} = \begin{pmatrix} \cos\theta_0 & -\sin\theta_0 \\ \sin\theta_0 & \cos\theta_0 \end{pmatrix} \begin{pmatrix} i_{\alpha\_det} \\ i_{\beta\_det} \end{pmatrix} \qquad (1)$$

The current control unit 153 is implemented by feedback control of the dq coordinate system. The current control unit 153 calculates a current deviation as a difference between current command values id* and iq*, which are input from the speed control unit 151, and the current detection values $i_{d\_det}$ and $i_{q\_det}$ which are input from the dq conversion unit 152. Further, the current control unit 153 performs a control operation of PI control on the calculated current deviation, and outputs driving voltage command values $V_d$ and $V_q$ for causing a current to flow through the motor 11 in accordance with the current command.

As shown in Expression (2), the αβ→dq conversion unit 154 converts the driving voltage command values $V_d$ and $V_q$ of the dq coordinate system, which are input from the current control unit 153, into driving voltage command values $V_\alpha$ and $V_\beta$ of the αβ coordinate system. $V_\alpha$ represents a voltage command to be applied to the A-phase winding, and $V_\beta$ represents a voltage command to be applied to the B-phase winding.

$$\begin{pmatrix} V_\alpha \\ V_\beta \end{pmatrix} = \begin{pmatrix} \cos\theta_0 & \sin\theta_0 \\ -\sin\theta_0 & \cos\theta_0 \end{pmatrix} \begin{pmatrix} V_d \\ V_q \end{pmatrix} \qquad (2)$$

The PWM signal generation unit 16 outputs, to the inverter 17, a PWM signal subjected to pulse width modulation depending on the input driving voltage command values $V_\alpha$ and $V_\beta$. The inverter 17 is driven by the input PWM signal, and applies alternating current (AC) voltages corresponding to the driving voltage command values $V_\alpha$ and $V_\beta$ to the windings 112A and 112B, respectively. As illustrated in FIG. 2, the inverter 17 includes four field effect transistors (FETs) 171A, 173A, 175A, and 177A for driving the A-phase winding 112A, and four diodes 172A, 174A, 176A, and 178A. The inverter 17 also includes four FETs 171B, 173B, 175B, and 177B for driving the B-phase winding 112B and four diodes 172B, 174B, 176B, and 178B. The FETs are driven by PWM signals Aph, Apl, Anh, Anl, Bph, Bpl, Bnh, and Bnl input from the PWM signal generation unit 16. The diodes are free wheeling diodes. Output voltages VAp and VAn of the inverter 17 are applied to the A-phase winding 112A through the A-phase current detection resistor 121A, and output voltages VBp and VBn are applied to the B-phase winding 112B through the B-phase current detection resistor 121B. The driving voltage command generation unit 15, the PWM signal generation unit 16, and the inverter 17 are driving voltage generation units, and generate voltages to be applied to the windings 112A and 112B of the motor 11 based on the position $\theta_0$ estimated by the position estimation unit 13 and the speed vel calculated by the speed calculation unit 14.

Figure 3:
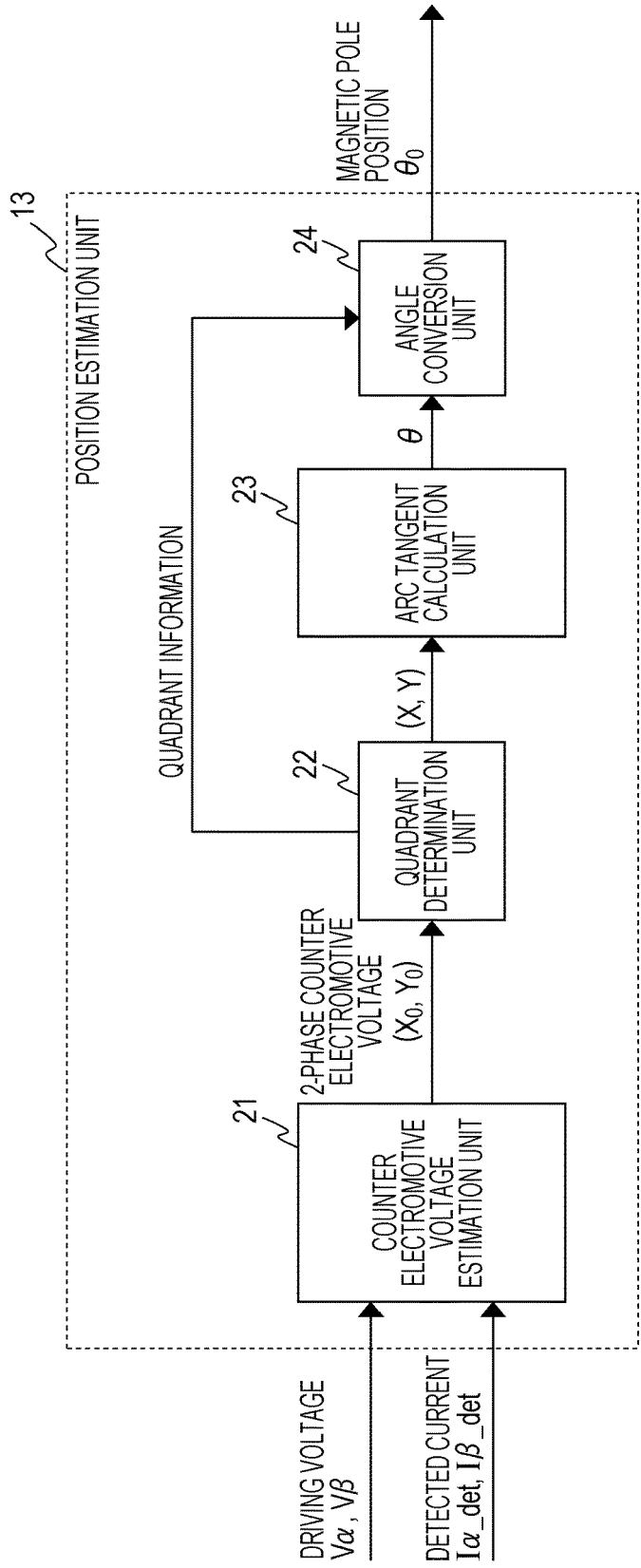
FIG. 3 is a diagram illustrating a position estimation unit according to the first embodiment.

Next, the position estimation unit 13 will be described. The position estimation unit 13 estimates counter electromotive voltages $V_{back\alpha}$ and $V_{back\beta}$ which are generated in the A-phase winding 112A and the B-phase winding 112B, respectively, and obtains a phase of the estimated counter electromotive voltage, thereby estimating the magnetic pole position $\theta_0$. FIG. 3 is a diagram illustrating a configuration example of the position estimation unit 13 of the motor control apparatus illustrated in FIG. 1. The position estimation unit 13 includes a counter electromotive voltage estimation unit 21, a quadrant determination unit 22, an arc tangent calculation unit 23, and an angle conversion unit 24. The counter electromotive voltage estimation unit 21 will be first described; the quadrant determination unit 22 and the angle conversion unit 24 will be described next; and then the arc tangent calculation unit 23 will be described.

First, the counter electromotive voltage estimation unit 21 will be described. The counter electromotive voltage estimation unit 21 estimates the counter electromotive voltages $V_{back\alpha}$ and $V_{back\beta}$ of two phases, i.e., the A-phase and the B-phase generated in the motor 11, based on the 2-phase driving voltage command values $V_\alpha$ and $V_\beta$ of the driving voltage command generation unit 15 and the current detection values $i_{\alpha\_det}$ and $i_{\beta\_det}$ of the current detection unit 12. The estimation of the counter electromotive voltages is performed by a circuit equation for the motor as shown in Expression (3). In this case, R represents a resistance value of each of the windings 112A and 112B, and L represents an inductance value of each of the windings 112A and 112B. The values to be used are stored in advance.

$$V_{back\alpha} = V_\alpha - \left(R + L\frac{d}{dt}\right) \times i_{\alpha\_det} \qquad (3)$$

$$V_{back\beta} = V_\beta - \left(R + L\frac{d}{dt}\right) \times i_{\beta\_det}$$

Next, the quadrant determination unit 22 and the angle conversion unit 24 will be described. Hereinafter, in order to explain CORDIC calculation using an XY coordinate system, as shown in Expression (4), the A-phase counter electromotive voltage $V_{back\alpha}$ is represented by a value $X_0$ on a real axis, and the B-phase counter electromotive voltage signal $V_{back\beta}$ is represented by a value $Y_0$ on an imaginary axis. The counter electromotive voltage estimation unit 21 outputs, to the quadrant determination unit 22, coordinate data $(X_0, Y_0)$ on a two-dimensional plane corresponding to the A-phase counter electromotive voltage $V_{back\alpha}$ and the B-phase counter electromotive voltage signal $V_{back\beta}$. The quadrant determination unit 22 and the angle conversion unit 24 estimate the magnetic pole position $\theta_0$ of the rotor 111 based on the coordinate data $(X_0, Y_0)$.

$$\begin{pmatrix} X_0 \\ Y_0 \end{pmatrix} = \begin{pmatrix} V_{back\alpha} \\ V_{back\beta} \end{pmatrix} \qquad (4)$$

The quadrant determination unit 22 determines the quadrant in which the coordinates $(X_0, Y_0)$ of the 2-phase counter electromotive voltage are positioned. When the coordinates are in the second to fourth quadrants, the quadrant determination unit 22 moves the coordinates to the first quadrant, and the coordinates obtained after the movement are represented by (X, Y). In other words, the quadrant determination unit 22 determines the quadrant in which the coordinate data $(X_0, Y_0)$ on the counter electromotive voltage estimated by the counter electromotive voltage estimation unit 21 is positioned. Further, the quadrant determination unit 22 moves the coordinate data $(X_0, Y_0)$ of the counter electromotive voltage according to the determined quadrant, and generates coordinate data (X, Y) to be output to the arc tangent calculation unit 23. The reason for moving the coordinates to the first quadrant is that the arc tangent calculation unit 23 performs calculation to obtain an angle corresponding to one quadrant from 0° to 90° and it is necessary to combine the result of determination of the quadrant so as to obtain angles of all quadrants including the second to fourth quadrants. A method for moving the coordinates is, for example, a rotational movement or a symmetrical movement. This embodiment illustrates a case where the rotational movement is employed. The angle conversion unit 24 obtains the magnetic pole position $\theta_0$ by combining the angle corresponding to the amount of movement of the coordinates by the quadrant determination unit 22 with the result of the arc tangent calculation.

Specific processing by classifying the quadrants in which the coordinates $(X_0, Y_0)$ of the 2-phase counter electromotive voltage are positioned will be described. First, a case where the coordinates $(X_0, Y_0)$ are positioned in the first quadrant will be described. When $X_0 \geq 0$ and $Y_0 \geq 0$, the quadrant determination unit 22 determines that the coordinates are positioned in the first quadrant. The coordinates are not moved. The coordinates (X, Y) to be input to the arc tangent calculation unit 23 indicate the same values as those of the coordinates $(X_0, Y_0)$ of the 2-phase counter electromotive voltage as shown in Expression (5). As shown in Expression (6), the angle conversion unit 24 directly outputs the arc tangent calculation result $\theta$ to the magnetic pole position $\theta_0$.

$$\begin{pmatrix} X \\ Y \end{pmatrix} = \begin{pmatrix} X_0 \\ Y_0 \end{pmatrix} \qquad (5)$$

$$\theta_0 = \theta \qquad (6)$$

Figure 4A:
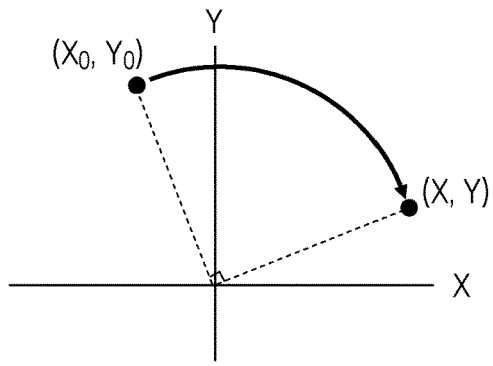
FIGS. 4A to 4C are graphs each illustrating a rotational movement.

Next, a case where the coordinates $(X_0, Y_0)$ are positioned in the second quadrant will be described. When $X_0 < 0$ and $Y_0 \geq 0$, the quadrant determination unit 22 determines that the coordinates are positioned in the second quadrant, and moves the coordinates from the coordinates $(X_0, Y_0)$ to the coordinates (X, Y) in the first quadrant by a rotational movement of −90 degrees as shown in Expression (7). FIG. 4A illustrates the movement of the coordinates. The original angle $\theta_0$ is converted to $\theta$ as shown in Expression (8). The arc tangent calculation unit 23 performs an arc tangent calculation using the coordinate data (X, Y) moved by the quadrant determination unit 22, thereby calculating the angle of deviation $\theta$. Lastly, the angle conversion unit 24 obtains the original angle $\theta_0$ by adding 90 degrees to the angle of deviation $\theta$ obtained as a result of the arc tangent calculation result as shown in Expression (9), and outputs the original angle $\theta_0$ thus obtained.

$$\begin{pmatrix} X \\ Y \end{pmatrix} = \begin{pmatrix} 0 & -1 \\ 1 & 0 \end{pmatrix} \begin{pmatrix} X_0 \\ Y_0 \end{pmatrix} = \begin{pmatrix} -Y_0 \\ X_0 \end{pmatrix} \qquad (7)$$

$$\theta = \theta_0 - 90 \qquad (8)$$

$$\theta = \theta_0 + 90 \qquad (9)$$

Figure 4B:
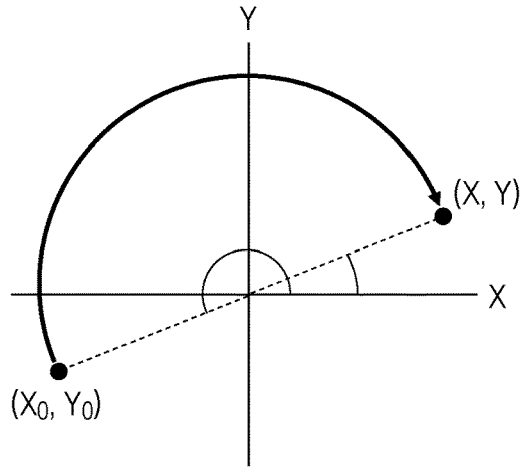

Next, when the coordinates $(X_0, Y_0)$ satisfy $X_0 < 0$ and $Y_0 < 0$, the quadrant determination unit 22 determines that the coordinates are positioned in the third quadrant, and moves the coordinates to the first quadrant by a rotational movement of −180 degrees as shown in Expression (10). FIG. 4B illustrates the movement of the coordinates. The original angle $\theta_0$ is converted to $\theta$ as shown in Expression (11). The arc tangent calculation unit 23 performs an arc tangent calculation using the coordinate data (X, Y) and calculates the angle of deviation $\theta$. Lastly, the angle conversion unit 24 obtains the original angle $\theta_0$ by Expression (12) and outputs the original angle $\theta_0$ thus obtained.

$$\begin{pmatrix} X \\ Y \end{pmatrix} = \begin{pmatrix} -1 & 0 \\ 0 & -1 \end{pmatrix} \begin{pmatrix} X_0 \\ Y_0 \end{pmatrix} = \begin{pmatrix} -X_0 \\ -Y_0 \end{pmatrix} \quad (10)$$

$$\theta = \theta_0 - 180 \quad (11)$$

$$\theta_0 = \theta + 180 \quad (12)$$

Figure 4C:
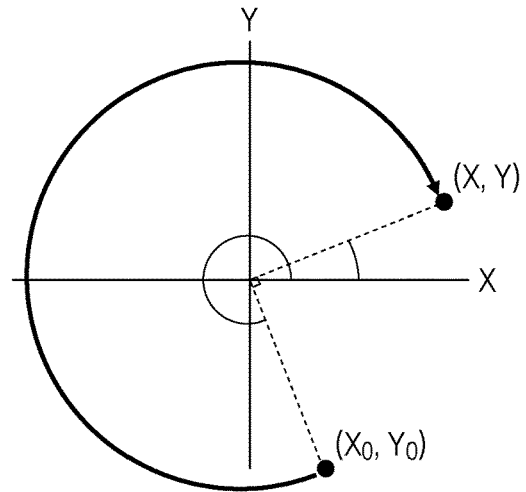

Next, when the coordinates $(X_0, Y_0)$ satisfy $X_0 \geq 0$ and $Y_0 < 0$, the quadrant determination unit 22 determines that the coordinates are positioned in the fourth quadrant, and moves the coordinates to the first quadrant by a rotational movement of −270 degrees as shown in Expression (13). FIG. 4C illustrates the movement of the coordinates. The original angle $\theta_0$ is converted to $\theta$ as shown in Expression (14). The arc tangent calculation unit 23 performs an arc tangent calculation using the coordinate data (X, Y) and calculates the angle of deviation $\theta$. Lastly, the angle conversion unit 24 obtains the original angle $\theta_0$ by Expression (15) and outputs the original angle $\theta_0$.

$$\begin{pmatrix} X \\ Y \end{pmatrix} = \begin{pmatrix} 0 & 1 \\ -1 & 0 \end{pmatrix} \begin{pmatrix} X_0 \\ Y_0 \end{pmatrix} = \begin{pmatrix} Y_0 \\ -X_0 \end{pmatrix} \quad (13)$$

$$\theta = \theta_0 - 270 \quad (14)$$

$$\theta_0 = \theta + 270 \quad (15)$$

As described above, the quadrant determination unit 22 first performs quadrant determination and coordinate movement of the coordinates $(X_0, Y_0)$. The arc tangent calculation unit 23 performs an arc tangent calculation using the coordinate data (X, Y) and calculates the angle of deviation $\theta$. The angle conversion unit 24 corrects the angle of deviation $\theta$, which is calculated by the arc tangent calculation unit 23, in accordance with the movement of the coordinate data $(X_0, Y_0)$ by the quadrant determination unit 22, thereby calculating the angle of deviation $\theta_0$ corresponding to the magnetic pole position of the rotor 111. Specifically, the angle conversion unit 24 obtains the angle of deviation $\theta_0$ of the magnetic pole position by adding the angle corresponding to the amount of movement of the coordinates to the angle of deviation $\theta$ obtained as a result of the arc tangent calculation.

Next, the arc tangent calculation unit 23 will be described. The arc tangent calculation unit 23 performs an arc tangent calculation in which harmonics, which are one of the features of this embodiment, are taken into consideration. Therefore, the principle of the processing calculation will first be described, and then the actual processing configuration will be described.

Figure 5:
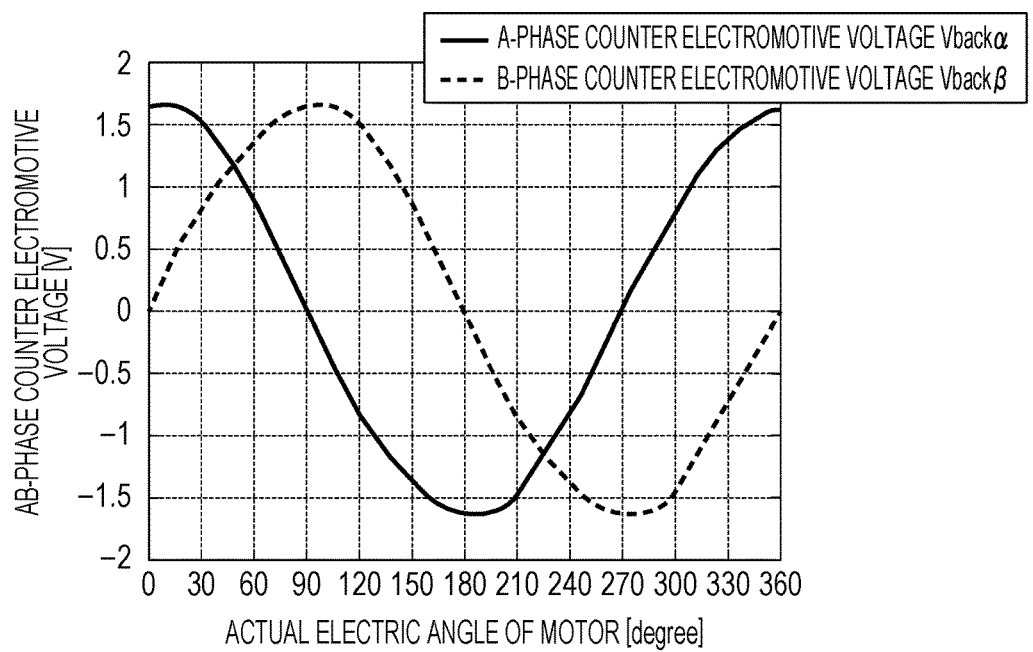
FIG. 5 is a graph illustrating an AB-phase counter electromotive voltage of a 2-phase stepping motor.

FIG. 5 illustrates a counter electromotive voltage waveform of a 2-phase stepping motor. The counter electromotive voltage waveform illustrated in FIG. 5 includes a large number of third-order harmonic components. Expression (16) in which the third-order harmonics are taken into consideration is herein defined.

$$X_0 = a_1 \cos \theta_0 + a_3 \cos 3(\theta_0 - \varphi)$$

$$Y = a_1 \sin \theta_0 - a_3 \sin 3(\theta_0 - \varphi) \quad (16)$$

$a_1$ represents an intensity of a fundamental wave component, and $a_3$ represents an intensity of a third-order harmonic component. The phase of the third-order harmonic component is shifted by $\varphi$. However, if the third-order harmonic component is expressed by a binomial expression as shown in Expression (17) using an addition theorem and is further expressed by shown in Expression (18), Expression (19) is obtained.

$$X_0 = a_1 \cos \theta_0 + a_3 \cos 3\varphi \cos 3\theta_0 + a_3 \sin 3\varphi \sin 3\theta_0$$

$$Y_0 = a_1 \cos \theta_0 - a_3 \cos 3\varphi \sin 3\theta_0 + a_3 \sin 3\varphi \cos 3\theta_0 \quad (17)$$

$$a_{31} = a_3 \cos 3\varphi$$

$$a_{32} = a_3 \sin 3\varphi \quad (18)$$

$$X_0 = a_1 \cos \theta_0 + a_{31} \cos 3\theta_0 + a_{32} \sin 3\theta_0$$

$$Y_0 = a_1 \sin \theta_0 - a_{31} \sin 3\theta_0 + a_{32} \cos 3\theta_0 \quad (19)$$

Hereinafter, the principle of processing calculation will be described based on the Expression (19). $a_1$ represents an intensity of a fundamental wave component, and $a_{31}$ and $a_{32}$ represent intensities in the first term and the second term of the third-order harmonic components, respectively. In the arc tangent calculation in which harmonics are taken into consideration, these intensities are known information. A ratio of a harmonic to a fundamental wave when the fundamental wave is 1 may be used as the intensity information, because it is sufficient that the intensity information indicates the intensity ratio between the fundamental wave and the harmonic component. The acquisition of the intensity information will be described in detail later in this embodiment. Hereinafter, a term including $a_1$ in Expression (19) is referred to as a fundamental wave component; a term including $a_{31}$ is referred to as a third-order harmonic first term component; and a term including $a_{32}$ is referred to as a third-order harmonic second term component. Expression (19) is a $\theta_0$-function expression. When the quadrant determination unit 22 moves the coordinates to the first quadrant as shown in Expressions (5) to (15), a $\theta$-function expression as shown in Expression (20) is obtained. Further, relational expressions as shown in Expressions (20) to (21) are obtained. When the relation Expression (21) is transformed, a relational expression as shown in Expression (22) is obtained.

$$X = a_1 \cos\theta + a_{31} \cos 3\theta + a_{32} \sin 3\theta \quad (20)$$
$$Y = a_1 \sin\theta - a_{31} \sin 3\theta + a_{32} \cos 3\theta$$

$$\frac{Y}{X} = \frac{a_1 \sin\theta - a_{31} \sin 3\theta + a_{32} \cos 3\theta}{a_1 \cos\theta + a_{31} \cos 3\theta + a_{32} \sin 3\theta} \quad (21)$$

$$a_1 Y \cos\theta - a_1 X \sin\theta + a_{31} Y \cos 3\theta + \quad (22)$$
$$a_{31} X \sin 3\theta + a_{32} Y \sin 3\theta - a_{32} X \cos 3\theta = 0$$

The arc tangent calculation unit 23 according to this embodiment obtains $\theta$ that satisfies the relational expression including the harmonic components as shown in Expression (22), thereby reducing an error in the arc tangent calculation due to the effect of harmonics. The arc tangent calculation unit 23 performs a rotation calculation in the process of obtaining $\theta$. The correspondence between the rotation calculation and the relational expression including the harmonic components in Expression (22) will now be described. A first term and a second term ($a_1 Y \cos\theta - a_1 X \sin\theta$) on the left-hand side of Expression (22) match a result $Y_{out1}$ of the Y-coordinate when $\theta$ right rotation calculation (Expression (23)) is performed on coordinates ($a_1 X, a_1 Y$)

$$\begin{pmatrix} X_{out1} \\ Y_{out1} \end{pmatrix} = \begin{pmatrix} \cos\theta & \sin\theta \\ -\sin\theta & \cos\theta \end{pmatrix} \begin{pmatrix} a_1 X \\ a_1 Y \end{pmatrix} \quad (23)$$

Further, a third term and a fourth term ($a_{31}Y \cos 3\theta - a_{31}X \sin 3\theta$) on the left-hand side of Expression (22) match a result $Y_{out31}$ of the Y-coordinate when a $3\theta$ left rotation calculation (Expression (24)) is performed on coordinates ($a_{31}X$, $a_{31}Y$).

$$\begin{pmatrix} X_{out31} \\ Y_{out31} \end{pmatrix} = \begin{pmatrix} \cos 3\theta & -\sin 3\theta \\ \sin 3\theta & \cos 3\theta \end{pmatrix} \begin{pmatrix} a_{31} X \\ a_{31} Y \end{pmatrix} \quad (24)$$

Further, a fifth term and a sixth term ($a_{32}Y \sin 3\theta - a_{32}X \cos 3\theta$) on the left-hand side of Expression (22) match $-X_{out32}$ obtained by reversing the sign of the result of the X-coordinate when a $3\theta$ left rotation calculation (Expression (25)) is performed on coordinates ($a_{32}X$, $a_{32}Y$)

$$\begin{pmatrix} X_{out32} \\ Y_{out32} \end{pmatrix} = \begin{pmatrix} \cos 3\theta & -\sin 3\theta \\ \sin 3\theta & \cos 3\theta \end{pmatrix} \begin{pmatrix} a_{32} X \\ a_{32} Y \end{pmatrix} \quad (25)$$

Expression (22) is consistent with the rotation calculation results as shown in Expressions (23), (24), and (25), and thus Expression (22) can be expressed by Expression (26).

$$Y_{out1} + Y_{out31} - X_{out32} = 0 \quad (26)$$

Similarly to a normal CORDIC calculation, the arc tangent calculation unit 23 according to this embodiment repeatedly performs a rotation calculation in which the rotation angle is decreased for each repetition and judges the subsequent rotation direction, thereby obtaining θ. The arc tangent calculation of this embodiment differs from the normal CORDIC calculation in that not only a rotation calculation for a fundamental wave component, but also a rotation calculation for a harmonic component is performed and θ which satisfies the relational expression including the harmonic components shown in Expression (26) is obtained using the results of the rotation calculations for each component. In order to search θ which satisfies Expression (26) by repeated rotation calculations, the rotation direction of the subsequent rotation calculation is judged using a discriminant shown in Expression (27) based on Expression (26).

$$Y_{out1} + Y_{out31} - X_{out32} \geq 0 \quad (27)$$

The arc tangent calculation unit 23 repeatedly performs the rotation calculation and the judgment of the rotation direction, and then obtains a total of angles obtained by repeated rotation calculations of the fundamental wave component, thereby calculating θ which satisfies Expression (26). The principle of the processing calculation of the arc tangent calculation in which harmonic components are taken into consideration has been described above. Next, the configuration of the actual arc tangent calculation unit 23 and a processing flow will be described with reference to FIGS. 6 and 7.

Figure 6:
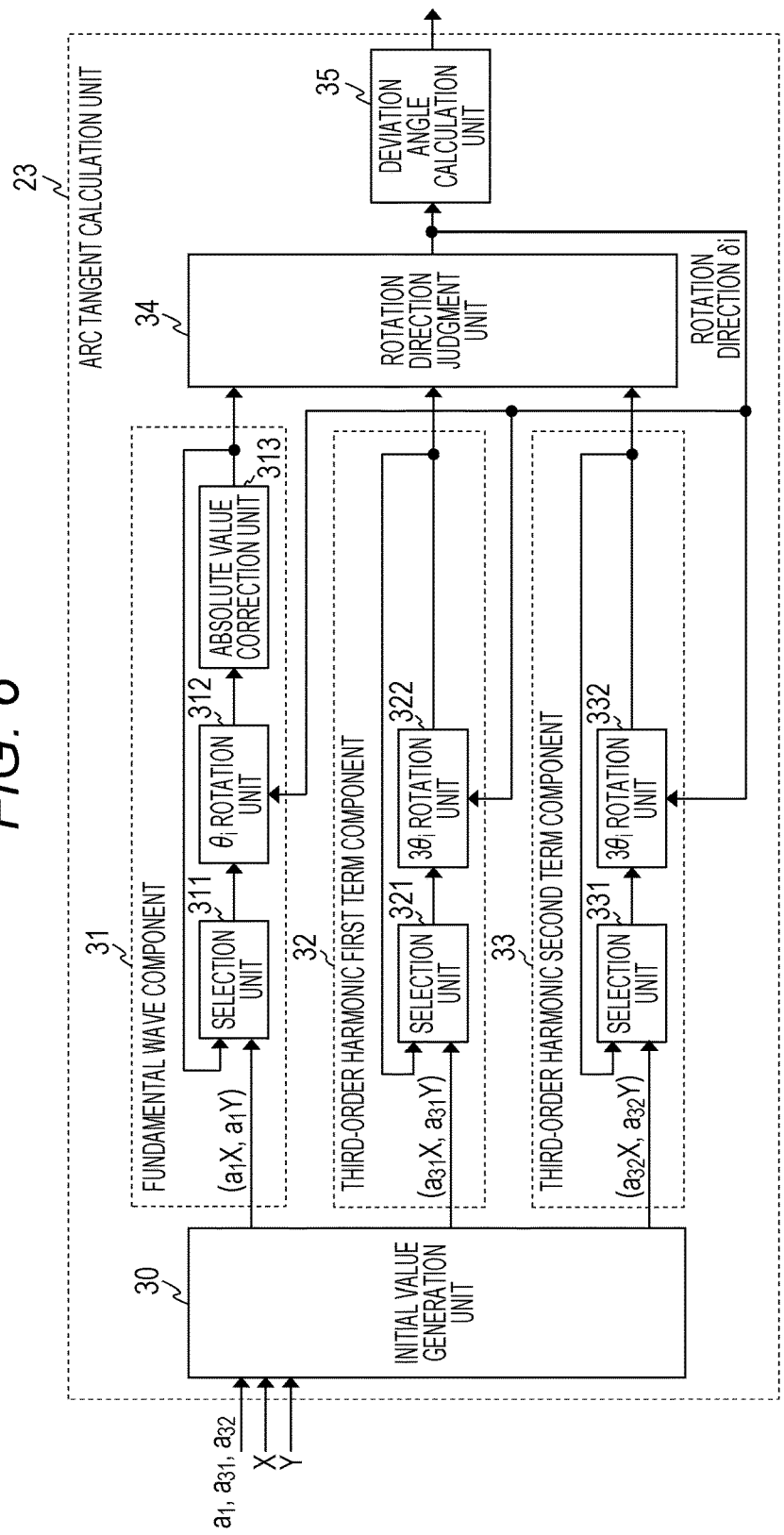
FIG. 6 is a diagram illustrating a configuration of an arc tangent calculation unit in consideration of harmonics according to the first embodiment.
Figure 7:
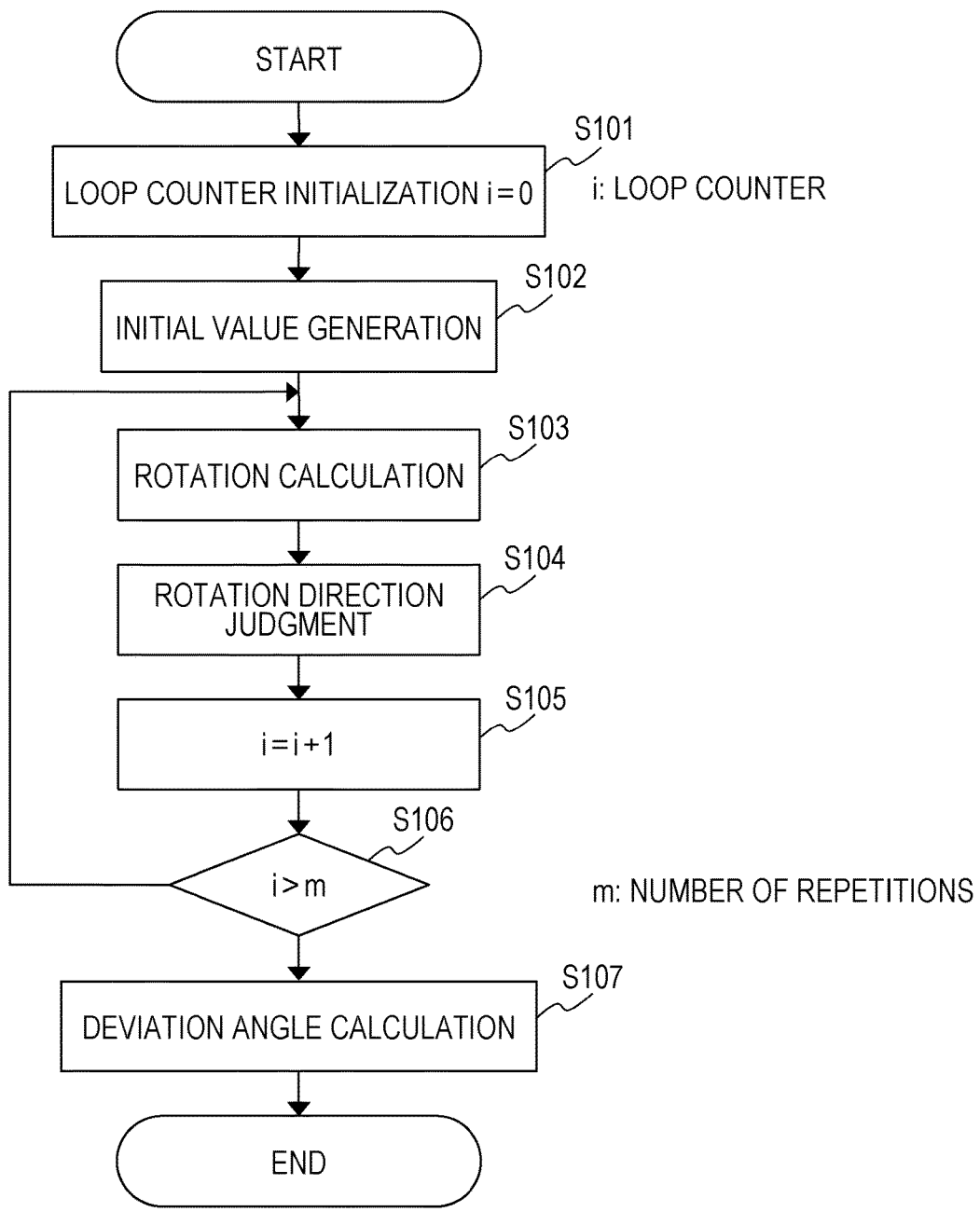
FIG. 7 is a flowchart illustrating a processing flow of the arc tangent calculation unit in consideration of harmonics.

FIG. 6 is a diagram illustrating a configuration example of the arc tangent calculation unit 23 in which harmonics are taken into consideration. FIG. 7 is a flowchart in which harmonics are taken into consideration. As illustrated in FIG. 6, the arc tangent calculation unit 23 includes an initial value generation unit 30, a fundamental wave component rotation calculation unit 31, a third-order harmonic first term component rotation calculation unit 32, a third-order harmonic second term component rotation calculation unit 33, a rotation direction judgment unit 34, and a deviation angle calculation unit 35. A specific processing flow will be described with reference to the flowchart illustrated in FIG. 7.

In step S101, when X and Y data are updated, the arc tangent calculation unit 23 clears a loop counter "i" to "0" to newly perform an arc tangent calculation. Next, in step S102, the initial value generation unit 30 generates initial input coordinates for performing rotation calculations for each component in the subsequent stage. Next, in step S103, the rotation calculation units 31, 32, and 33 for each component perform rotation calculation processing. Next, in step S104, the rotation direction judgment unit 34 judges the rotation direction of the subsequent rotation calculation of each of the rotation calculation units 31, 32, and 33 based on the results of the rotation calculations of the rotation calculation units 31, 32, and 33 for each component. Next, in step S105, the arc tangent calculation unit 23 increments the loop counter "i". Next, in step S106, when the loop counter "i" is equal to or lower than a repetition number m, the arc tangent calculation unit 23 returns processing to step S103. When the loop counter "i" is larger than the repetition number m, the arc tangent calculation unit 23 advances processing to step S107. In step S107, the deviation angle calculation unit 35 calculates, as the angle of deviation θ of the fundamental wave, a total of rotation angles obtained as a result of the rotation calculation by the fundamental wave component rotation calculation unit 31. A series of processing described above is the CORDIC calculation processing in which harmonic components are taken into consideration.

Next, each processing unit of the arc tangent calculation unit 23 in which harmonics are taken into consideration as illustrated in FIG. 6 will be described. The initial value generation unit 30 generates initial input coordinates of each of the rotation calculation units 31, 32, and 33 in the subsequent stage based on intensity information ($a_1$, $a_{31}$, $a_{32}$) supplied from a higher-order control unit, A-phase data X, and B-phase data Y. The initial input coordinates of the fundamental wave component rotation calculation unit 31 are represented by ($a_1 X$, $a_1 Y$), and the initial input coordinates of the third-order harmonic first/second term component rotation calculation units 32 and 33 are represented by ($a_{31}X$, $a_{31}Y$) and ($a_{32}X$, $a_{32}Y$), respectively. The initial value generation unit 30 generates an initial value ($a_1 X$, $a_1 Y$) of coordinate data on the fundamental wave and initial values ($a_{31}X$, $a_{31}Y$) and ($a_{32}X$, $a_{32}Y$) of coordinate data on harmonics based on the coordinate data (X, Y), an intensity $a_1$ of the fundamental wave of the counter electromotive voltage, and intensities $a_{31}$ and $a_{32}$ of harmonics. The initial value generation unit 30 outputs, to the rotation calculation unit 31, the initial value ($a_1 X$, $a_1 Y$) of the coordinate data on the fundamental wave, outputs, to the rotation calculation unit 32, the initial value ($a_{31}X$, $a_{31}Y$) of the coordinate data on harmonics, and outputs, to the rotation calculation unit 33, the initial value ($a_{32}X$, $a_{32}Y$) of the coordinate data on harmonics. These values match the coordinates obtained by the rotation calculations as shown in the rotation calculation Expressions (Expression (23), Expression (24), and Expression (25)) described above regarding the principle of the processing calculation.

Next, the rotation calculation units 31, 32, and 33 for each component will be described. These units correspond to the rotation calculation Expressions (Expression (23), Expression (24), and Expression (25)) described above regarding the principle of the processing calculation. First, the fundamental wave component rotation calculation unit 31 will be described. The fundamental wave component rotation calculation unit 31 includes a selection unit 311, a θi rotation unit 312, and an absolute value correction unit 313. The selection unit 311 selects input coordinates to be supplied to the rotation unit 312 in the subsequent stage. Specifically, the selection unit 311 selects the initial value $(a_1X, a_1Y)$ generated by the initial value generation unit 30 in a first iterative calculation, and selects the result of the previous operation by the fundamental wave component rotation calculation unit 31 in second and subsequent iterative calculations. The θi rotation unit 312 executes the rotation calculation corresponding to the loop counter "i" as shown in Expression (28).

$$\begin{pmatrix} x_{1\_i} \\ y_{1\_i} \end{pmatrix} = \begin{pmatrix} 1 & -\delta_{def1}\delta_i 2^{-i} \\ \delta_{def1}\delta_i 2^{-i} & 1 \end{pmatrix} \begin{pmatrix} x_{1\_i-1} \\ y_{1\_i-1} \end{pmatrix} \quad (28)$$

In this case, $(x_{1\_i-1}, Y_{1\_i-1})$ represents input coordinate data on the θi rotation unit 312, and $(x_{1\_i}, Y_{1\_i})$ represents output coordinate data on the θi rotation unit 312. Further, the loop counter "i" takes values from 0 to m−1 for the final iterative calculation number m. When the loop counter "i" indicates 0 in Expression (28), coordinate data on the right-hand side is represented by $(x_{1\_-1}, y_{1\_-1})$. This indicates that the initial value $(a_1X, a_1Y)$ is selected by the selection unit 311 as a result of the first iterative calculation. The rotation direction is determined by a rotation direction $\delta_i$ and a reference rotation direction $\delta_{def1}$. The rotation direction $\delta_i$ indicates "1" in the first iterative calculation (i=0), and in the subsequent calculation, "1" or "−1" is selected depending on the result of the judgment by the rotation direction judgment unit 34. On the other hand, the reference rotation direction $\delta_{def1}$ is set for each component and is not changed in each iterative calculation. As the reference rotation direction $\delta_{def1}$, a value at which the rotation direction of the rotation calculation expression (Expression 23) for obtaining an element $(Y_{out1})$ of the fundamental wave component of the rotation direction discriminant (26) matches the rotation direction of the initial rotation calculation is set. The rotation direction of the rotation calculation expression (Expression 23) for obtaining the element $(Y_{out1})$ of the fundamental wave component is a rightward rotation direction, and the rotation direction $\delta_i$ in the initial calculation indicates "1". Accordingly, the reference rotation direction $\delta_{def1}$ indicates the value "−1". Further, an actual rotation angle $\theta_i$ of rotation calculation for a rotation calculation number "i" as shown in Expression (28) is expressed by Expression (29).

$$\theta_i = \tan^{-1}(2^{-i}) \quad (29)$$

The absolute value correction unit 313 corrects an absolute value difference due to a difference (=2 times) between the rotation calculation number of the θi rotation unit 312 for the fundamental wave component and the rotation calculation number of a rotation calculation 3θi rotation unit 322 for a third-order harmonic component to be described later. Rotation processing of the rotation units 312 and 322 is processing in which the length (=absolute value) of a vector varies depending on a rotation angle. Since there is a difference (=2 times) between the rotation calculation number of the θi rotation unit 312 for the fundamental wave component and the rotation calculation number of the rotation calculation 3θi rotation unit 322 for the third-order harmonic component to be described later, a difference occurs in the rate of change of the absolute value, so that an error occurs in the CORDIC calculation in which harmonics are taken into consideration. To avoid this, the absolute value correction unit 313 corrects the absolute value. Specifically, the absolute value correction unit 313 corrects the absolute value of the result of the rotation calculation of the rotation calculation unit 31 so that the rate of change in the absolute value of the result of the rotation calculation of the rotation calculation unit 31 matches the rate of change in the absolute value of the result of the rotation calculation of the rotation calculation units 32 and 33. A correction coefficient $C_i$ for the absolute value of the first rotation calculation is shown in Expression (30), and the operation shown in Expression (31) is carried out.

$$C_i = (1 + 2^{-2i})^{\frac{1}{2}} \quad (30)$$

$$\begin{pmatrix} x_{1\_out} \\ y_{1\_out} \end{pmatrix} = C_i^2 \begin{pmatrix} x_{1\_in} \\ y_{1\_in} \end{pmatrix} \quad (31)$$

$X_{1\_in}$ and $Y_{1\_in}$ on the right-hand side represent rotation coordinate data which is obtained before correction and output from the θi rotation unit 312. $X_{1\_out}$ and $Y_{1\_out}$ on the left-hand side represent rotation coordinate data corrected (updated) by the absolute value correction unit 313. When a difference between the order of the fundamental wave of the rotation calculation unit 31 and the order of harmonics of the rotation calculation units 32 and 33 is a positive even number, the absolute value correction unit 313 performs a reciprocating rotation calculation including a pair of a $+\theta_i$ rotation calculation in a positive direction and a $-\theta_i$ rotation calculation in a negative direction as shown in Expression (32), thereby correcting the absolute value. The $-\theta_i$ rotation calculation in the negative direction is the $-\theta_i$ rotation calculation in the negative direction with the same rotation angle as that in the $+\theta_i$ rotation calculation in the positive direction. In Expression (32), the calculation can be performed by bit shifting, which is one of the features of the CORDIC calculation, and addition and/or subtraction, without using multiplication.

$$\begin{pmatrix} x_{1\_out} \\ y_{1\_out} \end{pmatrix} = \begin{pmatrix} 1 & -2^{-i} \\ 2^{-i} & 1 \end{pmatrix} \begin{pmatrix} 1 & 2^{-i} \\ -2^{-i} & 1 \end{pmatrix} \begin{pmatrix} x_{1\_in} \\ y_{1\_in} \end{pmatrix} \quad (32)$$

Next, the third-order harmonic first term component rotation calculation unit 32 will be described. The rotation calculation unit 32 includes a selection unit 321 and the 3θi rotation unit 322. The selection unit 321 selects input coordinates to be supplied to the rotation unit 322 in the subsequent stage. Specifically, the selection unit 321 selects the initial value $(a_{31}X, a_{31}Y)$ generated by the initial value generation unit 30 in the first iterative calculation, and selects the previous result of the rotation calculation unit 32 for the third-order harmonic component in second and subsequent iterative calculations. The 3θi rotation unit 322 has a feature in performing a CORDIC rotation calculation, and executes the rotation calculation corresponding to the iterative rotation calculation number "i" as shown in Expression (33).

$$\begin{pmatrix} x_{31\_i} \\ y_{31\_i} \end{pmatrix} = \begin{pmatrix} 1 & -\delta_{def31}\delta_i 2^{-i} \\ \delta_{def31}\delta_i 2^{-i} & 1 \end{pmatrix}^3 \begin{pmatrix} x_{31\_i-1} \\ y_{31\_i-1} \end{pmatrix} \quad (33)$$

The 3θi rotation unit 322 performs processing similar to the processing of the θi rotation unit 312 for the fundamental wave component. The initial value is $(a_{31}X, a_{31}Y)$. The rotation direction is determined by the rotation direction $\delta_i$ and the reference rotation direction $\delta_{def31}$. The rotation direction $\delta_i$ indicates "1" in the first iterative calculation number (i=0), and in the subsequent calculation, "1" or "−1" is selected depending on the result of the judgment by the rotation direction judgment unit 34. The reference rotation direction $\delta_{def31}$ is set for each component, and "1" is set as a value at which the rotation direction of the rotation calculation expression (Expression 23) for obtaining an element ($Y_{out31}$) of the third-order harmonic first term component matches the rotation direction of the initial rotation calculation. An actual rotation angle 3θi of the rotation calculation shown in Expression (33) is expressed by Expression (34).

$$3\theta_i = 3 \cdot \tan^{-1}(2^{-i}) \quad (34)$$

Next, the third-order harmonic second term component rotation calculation unit 33 will be described. Similarly to the case of the third-order harmonic first term component, the rotation calculation unit 33 sets $(a_{32}X, a_{32}Y)$ as the initial value, and executes a rotation calculation shown in Expression (35).

$$\begin{pmatrix} x_{32\_i} \\ y_{32\_i} \end{pmatrix} = \begin{pmatrix} 1 & -\delta_{def32}\delta_i 2^{-i} \\ \delta_{def32}\delta_i 2^{-i} & 1 \end{pmatrix}^3 \begin{pmatrix} x_{32\_i-1} \\ y_{32\_i-1} \end{pmatrix} \quad (35)$$

The processing of the rotation calculation units 31, 32, and 33 has been described. Next, the rotation direction judgment unit 34 will be described. The rotation direction judgment unit 34 determines the rotation direction $\delta_i$ in the subsequent iterative rotation calculation based on the results of the rotation calculation units 31, 32, and 33 for each component. A discriminant for determining the rotation direction $\delta_i$ is expressed by Expression (36) as described above regarding the principle of the processing calculation.

$$Y_{out11} + Y_{out31} - X_{out32} \geq 0 \quad (36)$$

When the Expression (36) is true, $\delta_i$ is 1, and when the Expression (36) is false, $\delta_i$ is −1. Then, the subsequent iterative rotation calculation is executed. FIG. 8 is a table illustrating the reference direction $\delta_{def}$ of rotation calculations for each component described above and elements of the rotation direction discriminant. The rotation calculation and the rotation direction judgment are executed by the final iterative calculation number m, thereby obtaining rotation coordinate data which converges to Expression (26) and a $\delta_i$ data stream (data history) indicating rotation angle information. As a last operation process, the deviation angle calculation unit 35 performs an operation shown in Expression (37) on the $\delta_1$ data stream, thereby obtaining the angle of deviation θ that is formed by the fundamental wave component and obtained by eliminating harmonic components.

$$\theta = \sum_{i=0}^{n-1} \delta_i \tan^{-1}(2^{-i}) \quad (37)$$

As described above, the arc tangent calculation unit 23 performs the arc tangent calculation in which harmonic components are taken into consideration. The rotation calculation unit 31 is a fundamental-wave rotation calculation unit which repeatedly performs a rotation calculation of coordinate data of the fundamental wave while decreasing the rotation angle. The rotation calculation units 32 and 33 are harmonic rotation calculation units which repeatedly perform a rotation calculation of coordinate data of harmonics while decreasing the rotation angle. The rotation calculation unit 32 is a first harmonic rotation calculation unit which performs a rotation calculation of coordinate data on a first term of a harmonic. The rotation calculation unit 33 is a second harmonic rotation calculation unit which performs a rotation calculation of coordinate data on a second term of the harmonic.

Figure 9A:
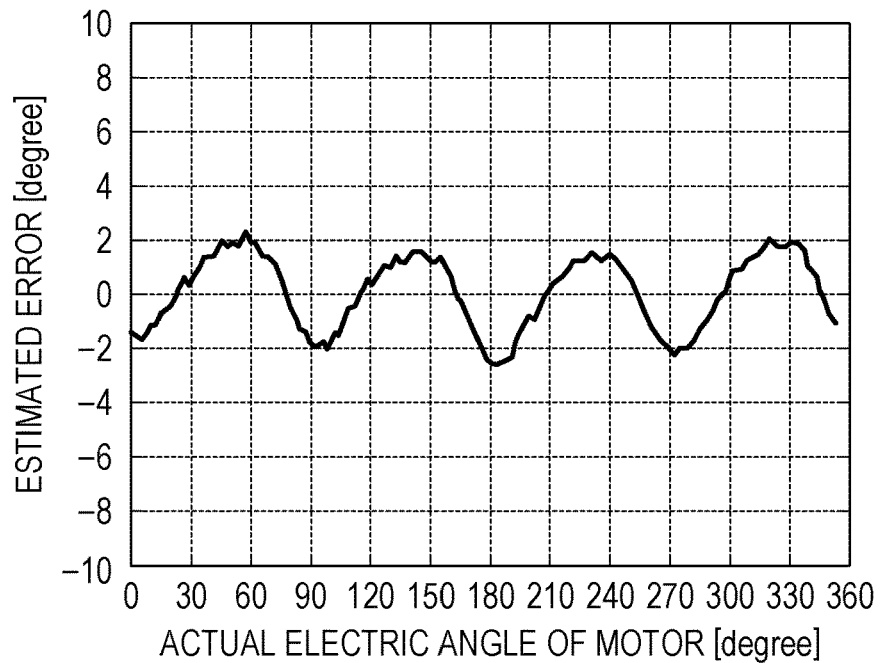
FIGS. 9A and 9B are graphs each illustrating an estimation error.
Figure 9B:
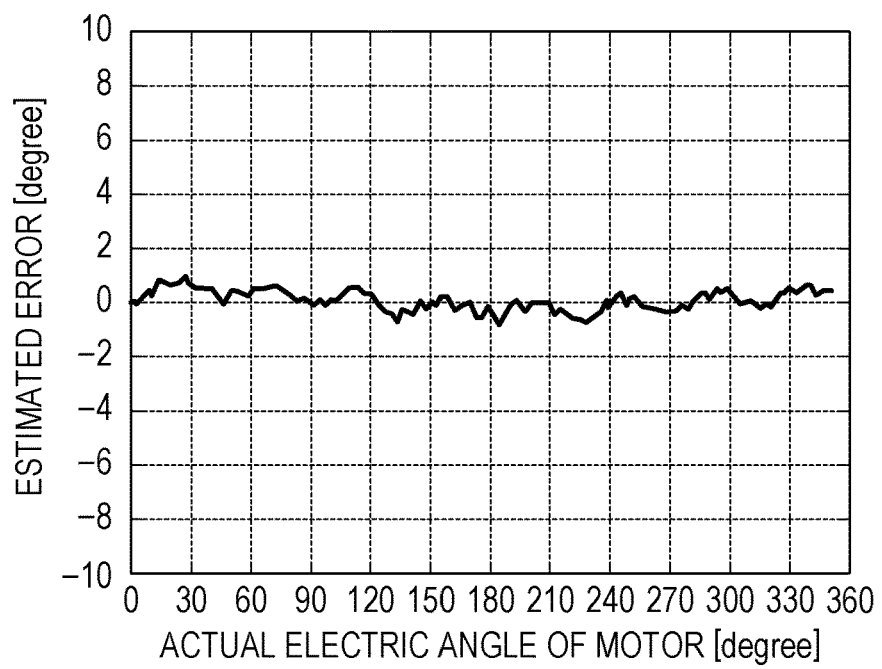

Next, effects of the CORDIC calculation in consideration of harmonics will be described. FIG. 9A illustrates an estimation error when the position of the counter electromotive voltage signal illustrated in FIG. 5 is estimated by a normal CORDIC calculation based on the fundamental wave. FIG. 9B illustrates an estimation error when the position is estimated by the CORDIC calculation in which harmonics are taken into consideration according to this embodiment. Calculation results obtained when fundamental wave component intensity information $a_1$ indicates 1.65; component intensity information $a_{31}$ about the third-order harmonic first term indicates −0.021; and component intensity information $a_{32}$ about the third-order harmonic second term indicates 0.048 are illustrated. A detected error in the operation illustrated in FIG. 9A is about ±2.52[deg]. A detected error in the operation illustrated in FIG. 9B according to this embodiment is about ±0.97[deg]. Thus, the detected error can be reduced.

Note that in this embodiment, Expression (19) in which the third-order harmonic is taken into consideration is defined and the arc tangent calculation based on the definition expression is carried out. However, if other harmonic components are large, an expression including the harmonic components may be defined and the operation may be carried out in a similar manner. Further, when the coordinates are positioned in the second to fourth quadrants, the quadrant determination unit 22 moves the coordinates to the first quadrant. However, during the process, the definition expression may be changed. While changing of the definition expression will be described in detail in second and third embodiments, the CORDIC calculation in which harmonics are taken into consideration may be carried out based on the changed definition expression.

Next, the acquisition of intensity information $(a_1, a_{31}, a_{32})$ about each component that is necessary for the CORDIC calculation in which harmonic components are taken into consideration will be described. The intensity information may be acquired in advance, or may be acquired during driving. A method for acquiring the intensity information during driving will now be described. The acquisition of the intensity information during driving is performed based on an estimated counter electromotive voltage obtained during driving. To increase the accuracy of acquiring the intensity information, the intensity information acquisition is performed by setting a condition for minimizing a variation in actual speed.

Figure 10:
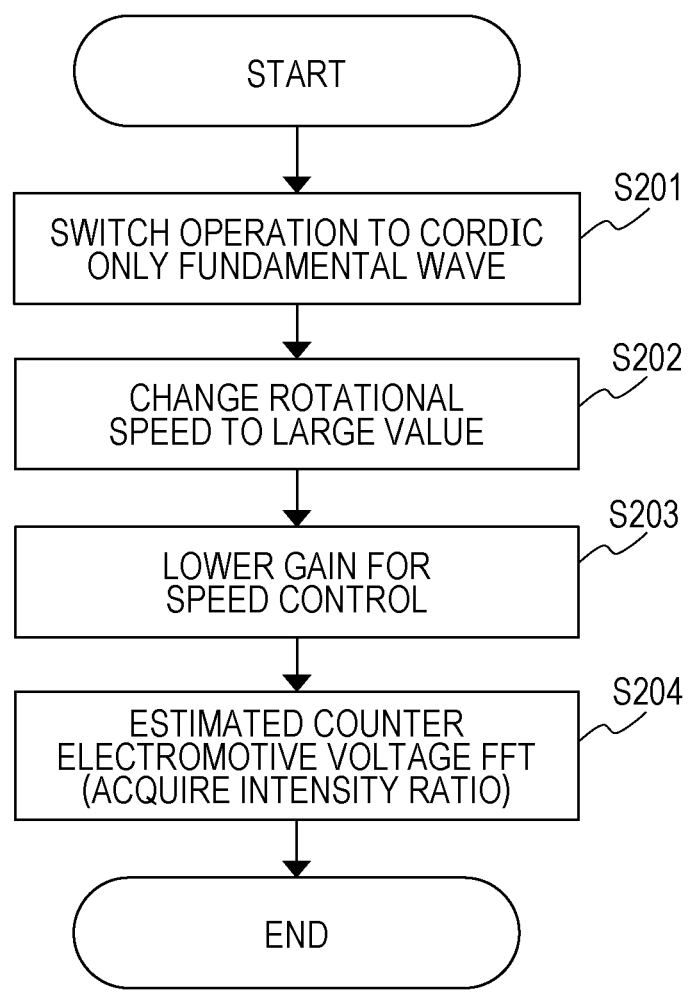
FIG. 10 is a flowchart illustrating a flow of acquiring intensity information.

FIG. 10 is a flowchart illustrating an example of the intensity information acquisition operation. When the CPU instructs the motor control apparatus to perform the intensity information acquisition operation, the motor control apparatus starts processing illustrated in FIG. 10. When the intensity information acquisition operation is instructed, in step S201, the motor control apparatus switches the operation to the position estimation by CORDIC calculation using only the fundamental wave in which no harmonics are taken into consideration. As a result, an estimation error due to the harmonic component of the counter electromotive voltage appears. As a method for performing the CORDIC calculation using only the fundamental wave, intensity information about the harmonic component in the intensity information about each component in a distortion correction CORDIC calculation is set to "0", thereby implementing the CORDIC calculation using only the fundamental wave.

Next, in step S202, in the motor control apparatus, the driving voltage command generation unit 15 changes the speed command value to a speed command value for a speed higher than a minimum speed in the rotational speed during normal driving of the motor 11. By increasing the rotational speed, the frequency of the rotation speed variation due to the counter electromotive voltage harmonic is shifted to a high frequency, and the actual rotational speed variation is reduced due to the effect of the inertia. While the amplitude of the counter electromotive voltage increases in proportion to the speed, the ratio between the amplitude of the fundamental wave component and the amplitude of the harmonic component is maintained. Accordingly, the intensity information acquired by increasing the rotational speed can be used for the arc tangent calculation during driving under conditions different from the rotational speed during the acquisition.

Next, in step S203, the motor control apparatus decreases the gain for the speed control of the speed control unit 151. Specifically, the motor control apparatus inserts a band-stop filter, such as a notch filter, which is used to decrease the gain of the frequency of the harmonic component of the counter electromotive voltage, into a control loop of the speed control of the speed control unit 151. Alternatively, the motor control apparatus decreases a PI gain for the speed control. As a result, a control based on error information about the estimated speed can be inhibited. The motor control apparatus changes the gain for the speed control to a value that is smaller than the gain for the speed control of the speed control unit 151 during normal driving of the motor 11.

Lastly, in step S204, the motor control apparatus performs a Fourier transform on the waveform of the counter electromotive voltage estimated by the counter electromotive voltage estimation unit 21 during driving of the motor 11 in the state described above, and acquires intensity information about each component. The motor control apparatus may acquire the component intensity information a plurality of times and average the pieces of the acquired information, to thereby increase the accuracy of the intensity information. The operation for acquiring the intensity information during driving has been described above.

In order to reduce a speed variation in the operation for acquiring the intensity information during driving, a load torque may be changed to a value smaller than that during estimation error correction driving. By setting the load torque to a smaller value, the current flowing through the motor decreases, which leads to a reduction in speed variation due to a torque ripple generated depending on the current flowing through the motor. The load torque is reduced by, for example, separating a member which is brought into contact with a rotation member from the rotation member. The motor control apparatus acquires the intensity information during driving at a load smaller than a maximum load among loads of normal driving of the motor 11.

Further, the speed variation may be reduced by increasing an inertia. The inertia may be increased by, for example, connecting a load to an inertial body such as a flywheel. The motor control apparatus acquires the intensity information during driving at an inertia larger than a minimum inertia among inertias during normal driving of the motor 11.

The operation for acquiring the intensity information about the counter electromotive voltage may be carried out once during assembly of the motor control apparatus at a factory, or at start-up of the motor control apparatus, or may be carried out each time upon power activation or when the normal operation is performed. An appropriate method may be selected depending on the features or the like of the motor to be controlled. The intensity information is acquired during driving, thereby making it possible to deal with a variation in the intensity information about the counter electromotive voltage in each motor and eliminating the need for an operation for performing measurements in advance in each motor.

Note that, as described below, the arc tangent calculation in which harmonics are taken into consideration may be performed by acquiring the intensity information in advance. For example, counter electromotive voltage data may be calculated by a magnetic field analysis using a finite element method and a frequency analysis may be performed to thereby obtain the intensity information about each component. Alternatively, the intensity information about each component may be obtained by connecting a target motor to another motor and rotating the target motor, measuring a counter electromotive voltage generated in the target motor, and performing a frequency analysis of the data.

As described above, the intensity information about the harmonic component of the counter electromotive voltage is acquired and the arc tangent calculation in which harmonics are taken into consideration is carried out using the intensity information, thereby enabling a reduction of an error in estimation of the magnetic pole position due to harmonics. Further, an error in the speed calculated from the estimated position information can be reduced. The motor is driven and controlled based on the accurate estimated position and estimated speed, thereby enabling a reduction in rotational unevenness and a reduction in noise and vibrations, and inhibiting the deterioration in efficiency.

Second Embodiment

A second embodiment of the present disclosure illustrates a case where a motor control apparatus is applied to a 3-phase direct current (DC) brushless motor. The second embodiment differs from the first embodiment in that three-phase windings are used; a driving circuit for three-phase driving is used; and a three-phase driving voltage and a three-phase driving current are used. However, in the position estimation operation, three-phase-to-two-phase conversion is performed on the driving voltage and the driving current, so that the driving voltage and the driving current can be handled as a 2-phase driving voltage and a 2-phase driving current, respectively. The counter electromotive voltage can also be estimated in two phases, like in the first embodiment, and the position estimation can be performed by performing an arc tangent calculation. Like in the first embodiment, in the second embodiment, the arc tangent calculation is performed based on the definition expression for the counter electromotive voltage including harmonic components, thereby reducing an error in position estimation due to harmonics. While the phenomenon according to this embodiment occurs not only in a three-phase motor, but also in a 2-phase motor, a case where a definition expression for a 2-phase counter electromotive voltage is changed after the quadrant determination unit moves coordinates when the coordinates are positioned in the second to fourth quadrants will be described.

An outline of a control apparatus of a 3-phase DC brushless motor will now be described below. Next, a position estimation unit will be described. In this case, as the principle of the arc tangent calculation in which harmonics are taken into consideration, the relation between the definition expression and the counter electromotive voltage and the rotation calculation and changing of the definition expression in each quadrant will be described. Lastly, the configuration and advantageous effects of the arc tangent calculation unit in which harmonics are taken into consideration will be described. An outline of a motor control apparatus of a 3-phase DC brushless motor will now be described with reference to FIGS. 11 and 12.

Figure 11:
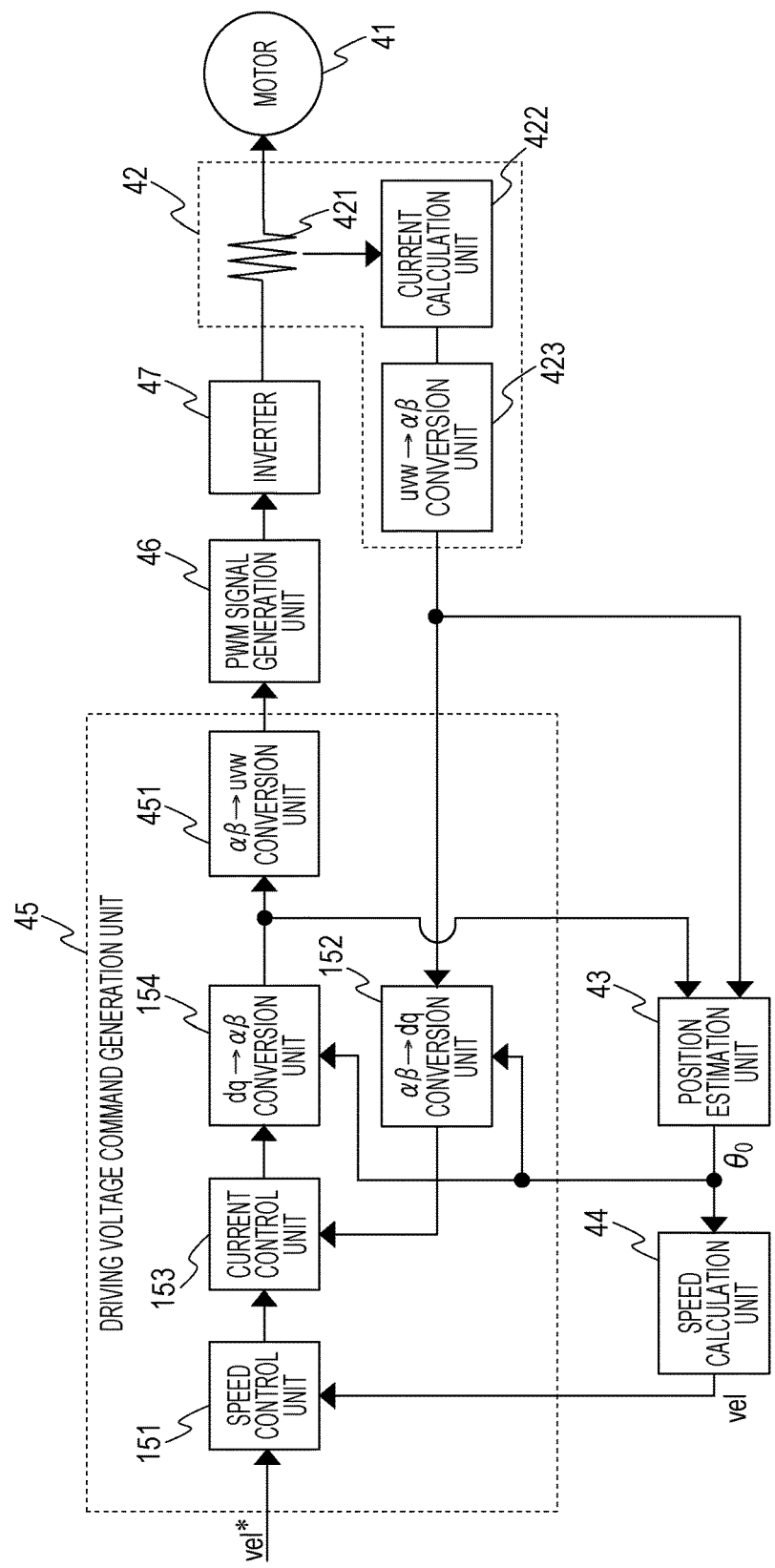
FIG. 11 is a diagram illustrating a schematic configuration of a motor control apparatus according to a second embodiment.
Figure 12:
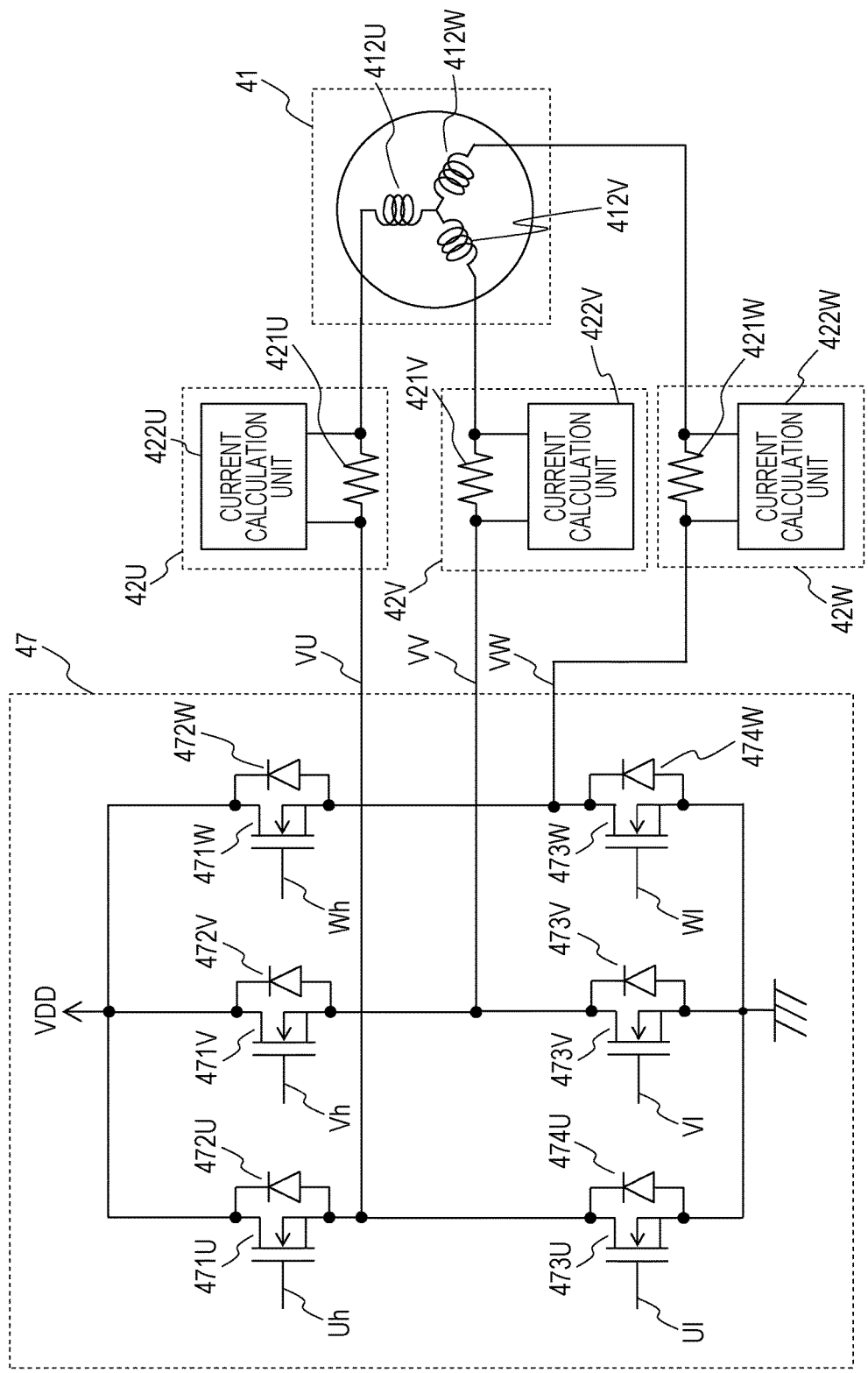
FIG. 12 is a diagram illustrating an electrical connection between an inverter and a motor according to the second embodiment.

FIG. 11 is a diagram illustrating a configuration example of the motor control apparatus according to the second embodiment. FIG. 12 is a diagram illustrating an electrical connection from an inverter to the motor. As illustrated in FIG. 11, the motor control apparatus includes a motor 41, a current detection unit 42, a position estimation unit 43, a speed calculation unit 44, a driving voltage command generation unit 45, a PWM signal generation unit 46, and an inverter 47. The motor 41 includes a rotor including a permanent magnet, and a stator including three-phase windings 412U, 412V, and 412W having a U-phase, a V-phase, and a W-phase, respectively. As illustrated in FIG. 11, the current detection unit 42 includes a current detection resistor 421, a current calculation unit 422, and a uvw→αβ conversion unit 423, and detects currents respectively having U, V, and W phases and flowing through the motor 41. The three-phase-to-two-phase conversion unit (uvw→αβ converter) 423 converts a current to a 2-phase current and outputs the 2-phase current. Expression (38) is an expression for three-phase-to-two-phase conversion of converting detected currents $i_{u\_det}$, $i_{v\_det}$, and $i_{w\_det}$ of three phases, i.e., a U-phase, a V-phase, and a W-phase into 2-phase currents $i_{\alpha\_det}$ and $i_{\beta\_det}$.

$$\begin{pmatrix} i_{\alpha\_det} \\ i_{\beta\_det} \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_{u\_det} \\ i_{v\_det} \\ i_{w\_det} \end{pmatrix} \quad (38)$$

The position estimation unit 43 estimates the magnetic pole position $\theta_0$ of the rotor of the motor 41 by performing a calculation based on the driving voltage command of the driving voltage command generation unit 45 and the current detection value of the current detection unit 42. Details thereof will be described later. The speed calculation unit 44 calculates the rotational speed of the motor 41 from the magnetic pole position $\theta_0$ of the motor 41 input from the position estimation unit 43. The driving voltage command generation unit 45 includes a speed control unit 151, an αβ→dq conversion unit 152, a current control unit 153, a dq→αβ conversion unit 154, and an αβ→uvw conversion unit 451. Unlike the 2-phase stepping motor according to the first embodiment, a 3-phase brushless motor according to the second embodiment uses a three-phase driving voltage command. Accordingly, the αβ→uvw conversion unit 451 as shown in Expression (39) is added.

$$\begin{pmatrix} V_u \\ V_v \\ V_w \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V_\alpha \\ V_\beta \end{pmatrix} \quad (39)$$

The PWM signal generation unit 46 outputs a PWM signal subjected to pulse width modulation depending on input driving voltage command values $V_u$, $V_v$, and $V_w$. The inverter 47 is driven by the input PWM signal, and applies alternating current (AC) voltages respectively corresponding to the driving voltage command values $V_u$, $V_v$, and $V_w$ to windings 412U, 412V, and 412W. An electrical connection from the inverter 47 to the motor 41 is illustrated in FIG. 12. The inverter 47 includes six FETs 471U, 473U, 471V, 473V, 471W, and 473W and six diodes 472U, 474U, 472V, 474V, 472W, and 474W. The FETs 471U, 473U, 471V, 473V, 471W, and 473W are driven by the PWM signal input from the PWM signal generation unit 46. The diodes 472U, 474U, 472V, 474V, 472W, and 474W are free wheeling diodes. The number of outputs of the inverter 47 corresponds to three phases U, V, and W and are respectively connected to coils 412U, 412V, and 412W of the motor 41 through current detection resistors 421U, 421V, and 421W. The control apparatus of the 3-phase DC brushless motor has been described above.

Figure 13:
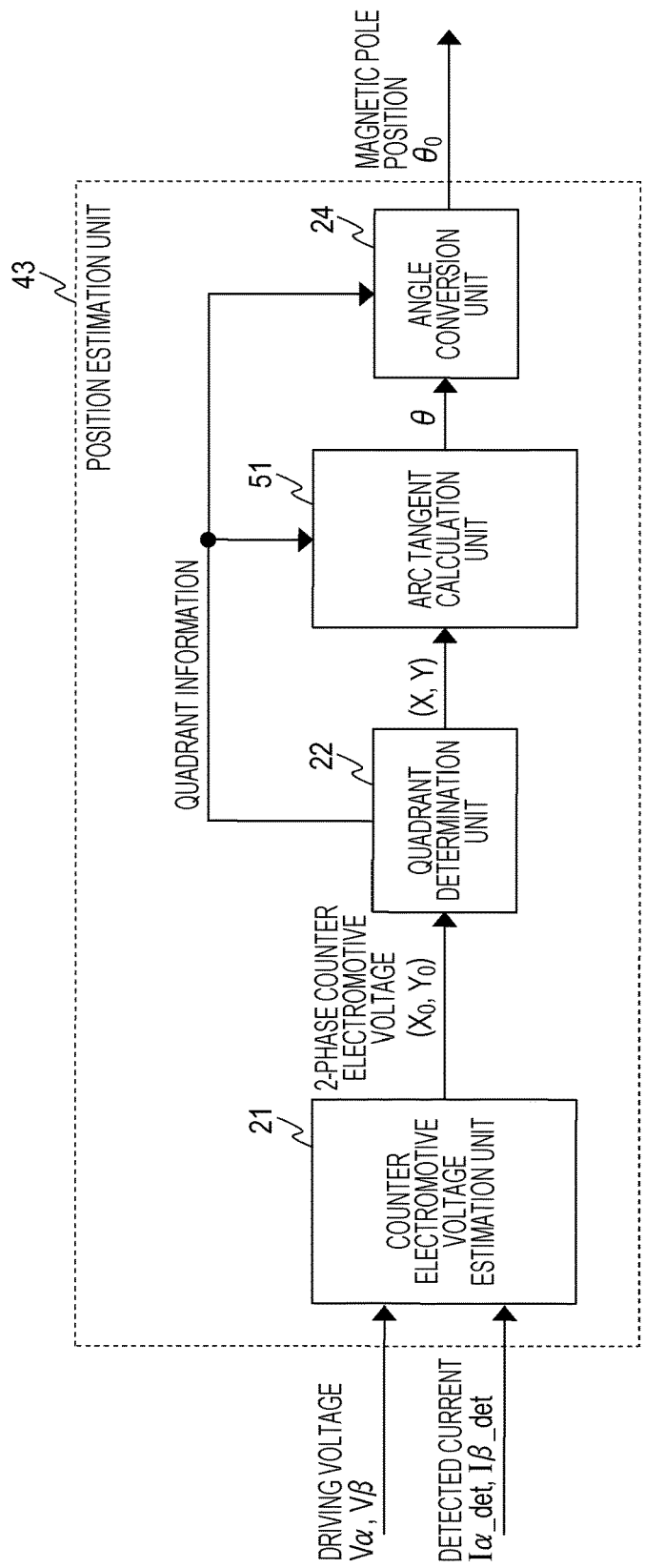
FIG. 13 is a diagram illustrating a position estimation unit according to the second embodiment.

Next, the configuration of the position estimation unit 43 will be described with reference to FIG. 13. Basically in the same manner as the first embodiment, the position estimation unit 43 calculates the counter electromotive voltages $V_{back\alpha}$ and $V_{back\beta}$ generated in the motor 41 from the 2-phase driving voltages $V_\alpha$ and $V_\beta$ and 2-phase detected currents $i_{\alpha\_det}$ and $i_{\beta\_det}$. Further, the position estimation unit 43 estimates the magnetic pole position $\theta_0$ by performing the arc tangent calculation of the 2-phase counter electromotive voltage. As illustrated in FIG. 13, the position estimation unit 43 includes a counter electromotive voltage estimation unit 21, a quadrant determination unit 22, an arc tangent calculation unit 51, and an angle conversion unit 24. The second embodiment differs from the first embodiment in that quadrant information is input to the arc tangent calculation unit 51 so as to deal with changing of the definition expression in each quadrant. The counter electromotive voltage estimation unit 21, the quadrant determination unit 22, and the angle conversion unit 24 are the same as those of the first embodiment. When the coordinates of the 2-phase counter electromotive voltage $(X_0, Y_0)$ are positioned in the second to fourth quadrants, the quadrant determination unit 22 moves the coordinates to the first quadrant by a rotational movement. The angle conversion unit 24 calculates the original angle $\theta_0$ in accordance with the coordinate movement.

Figure 14A:
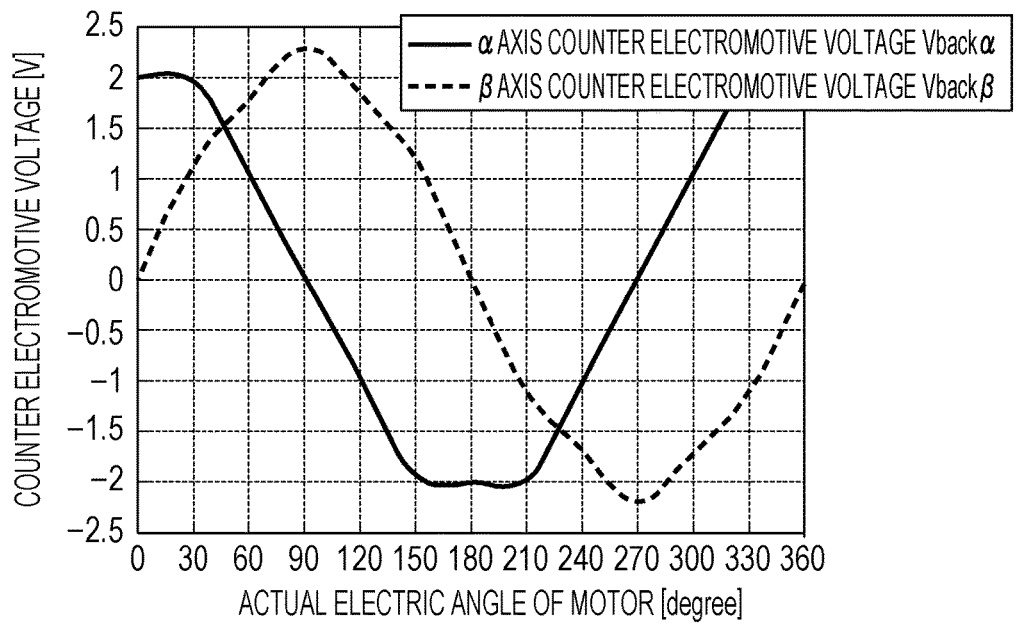
FIGS. 14A and 14B are graphs each illustrating a 2-phase counter electromotive voltage and counter electromotive voltages of U, V, and W phases.
Figure 14B:
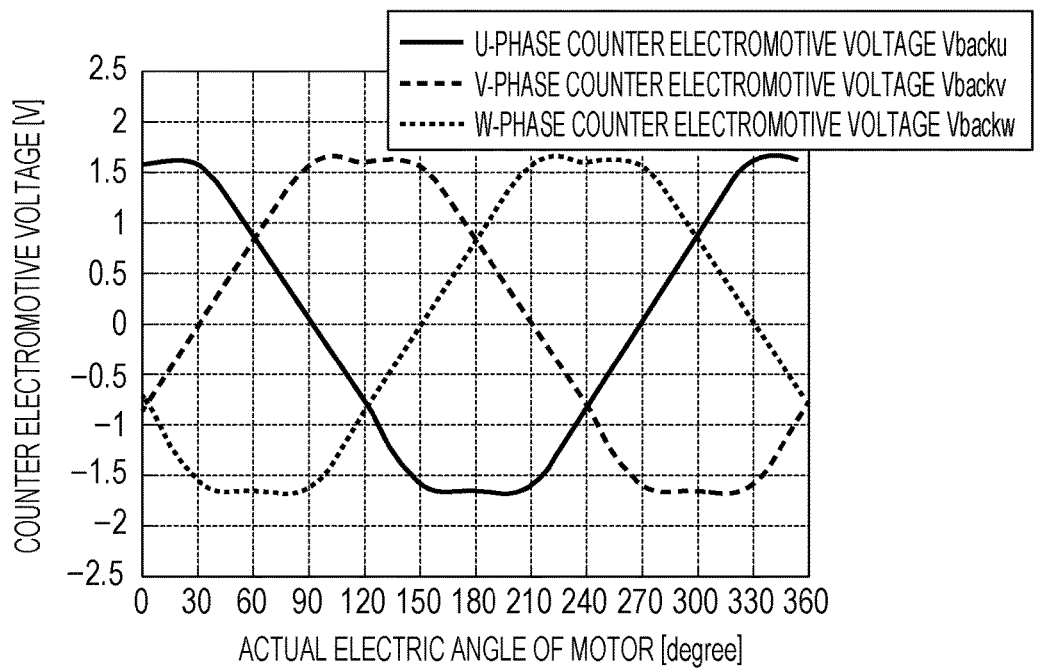

FIG. 14A illustrates a 2-phase counter electromotive voltage waveform of the 3-phase brushless motor. As illustrated in FIG. 14B, the 3-phase counter electromotive voltage waveform is a waveform of which phase is shifted by 120° at each of a U-phase, a V-phase, and a W-phase. A 2-phase waveform is illustrated in FIG. 14A. The 2-phase counter electromotive voltage waveform is a waveform including a large number of second, fifth, and seventh harmonic components. Accordingly, the definition expression for the 2-phase counter electromotive voltage in which the second, fifth, and seventh harmonic components are taken into consideration is represented by Expression (40).

$$X_0 = a_1 \cos\theta_0 + a_{21} \cos 2\theta_0 + a_{22} \sin\theta_0 + a_{51} \cos 5\theta_0 + a_{52} \sin 5\theta_0 + a_{71} \cos 7\theta_0 + a_{72} \sin 7\theta_0$$

$$Y_0 = a_1 \sin\theta_0 - a_{21} \sin 2\theta_0 + a_{22} \cos\theta_0 - a_{51} \sin 5\theta_0 + a_{52} \cos 5\theta_0 + a_{71} \sin 7\theta_0 - a_{72} \cos 7\theta_0 \quad (40)$$

$a_1$ represents intensity information about a fundamental wave component; $a_{21}$ and $a_{22}$ represent intensity information about a second-order harmonic first term component and intensity information about a second term component, respectively; $a_{51}$ and $a_{52}$ represent intensity information about a fifth-order harmonic first term component and intensity information about a second term component, respectively; and $a_{71}$ and $a_{72}$ represent intensity information about a seventh-order harmonic first term component and intensity information about a second term component. The reason why each harmonic component is divided into two terms is that, as described in the first embodiment, the phase of each harmonic component is shifted from the fundamental wave component. Changing of the definition expression in each quadrant will now be described. When the coordinates $(X_0, Y_0)$ of the 2-phase counter electromotive voltage are positioned in the first quadrant, the quadrant determination unit 22 does not perform coordinate movement as shown in Expressions (5) and (6). Accordingly, Expression (40) for $X_0$ ($\theta_0$) and $Y_0(\theta_0)$ is expressed by Expression (41) for $X(\theta)$ and $Y(\theta)$.

$$X = a_1 \cos\theta + a_{21} \cos 2\theta + a_{22} \sin\theta + a_{51} \cos 5\theta + a_{52} \sin 5\theta + a_{71} \cos 7\theta + a_{72} \sin 7\theta$$

$$Y = a_1 \sin\theta - a_{21} \sin 2\theta + a_{22} \cos\theta - a_{51} \sin 5\theta + a_{52} \cos 5\theta + a_{71} \sin 7\theta - a_{72} \sin 7\theta \quad (41)$$

A case where the coordinates $(X_0, Y_0)$ of the 2-phase counter electromotive voltage are positioned in the second to fourth quadrants is considered. When the coordinates $(X_0, Y_0)$ are positioned in the second to fourth quadrants, the quadrant determination unit 22 performs rotational movements as shown in Expressions (7) to (15). When the rotational movements are performed, the rotational movement of the harmonic component corresponds to a multiple of the order of the harmonic with respect to the fundamental wave component. Accordingly, a difference occurs between the phase of the fundamental wave component and the phase of the harmonic component, so that the definition expression is changed. Specifically, a case where the coordinates $(X_0, Y_0)$ are positioned in the second quadrant is considered. By rotational movements as shown in Expressions (7) to (9), functions $X(\theta)$ and $Y(\theta)$ shown in Expression (42) are obtained. When the functions are put together using an addition theorem, Expression (42) can be expressed by Expression (43). Thus, functions in Expression (43) obtained after the rotational movement are different from those in Expression (41) when the coordinates $(X_0, Y_0)$ are positioned in the first quadrant.

$$X_0 = Y = a_1 \cos(\theta+90) + a_{21} \cos 2(\theta+90) + a_{22} \sin 2(\theta+90) + a_{51} \cos 5(\theta+90) + a_{52} \sin 5(\theta+90) + a_{71} \cos 7(\theta+90) + a_{72} \sin 7(\theta+90)$$

$$Y_0 = -Y = a_1 \sin(\theta+90) - a_{21} \sin 2(\theta+90) + a_{22} \cos 2(\theta+90) - a_{51} \sin 5(\theta+90) + a_{52} \cos 5(\theta+90) + a_{71} \sin 7(\theta+90) - a_{72} \cos 7(\theta+90) \quad (42)$$

$$X = a_1 \cos\theta - a_{21} \sin 2\theta - a_{22} \cos 2\theta - a_{51} \cos 5\theta - a_{52} \sin 5\theta - a_{71} \cos 7\theta - a_{72} \sin 7\theta$$

$$Y = a_1 \sin\theta - a_{21} \cos 2\theta - a_{22} \sin 2\theta + a_{51} \sin 5\theta - a_{52} \cos 5\theta - a_{71} \sin 7\theta + a_{72} \cos 7\theta \quad (43)$$

Similarly, when the coordinates are positioned in the third quadrant and when the coordinates are positioned in the fourth quadrant, functions $X(\theta)$ and $Y(\theta)$ shown in Expressions (44) and (45) are obtained by the rotational movement. Functions in Expressions (44) and (45) are also different from functions in the Expression (41).

$$X = a_1 \cos\theta - a_{21} \cos 2\theta - a_{22} \sin 2\theta + a_{51} \cos 5\theta + a_{52} \sin 5\theta + a_{71} \cos 7\theta + a_{72} \sin 7\theta$$

$$Y = a_1 \sin\theta + a_{21} \sin 2\theta - a_{22} \cos 2\theta - a_{51} \sin 5\theta + a_{52} \cos 5\theta + a_{71} \sin 7\theta - a_{72} \cos 7\theta \quad (44)$$

$$X = a_1 \cos\theta + a_{21} \sin 2\theta + a_{22} \cos 2\theta - a_{51} \cos 5\theta - a_{52} \sin 5\theta - a_{71} \cos 7\theta + a_{72} \sin 7\theta$$

$$Y = a_1 \sin\theta + a_{21} \cos 2\theta - a_{22} \sin 2\theta + a_{51} \sin 5\theta - a_{52} \cos 5\theta - a_{71} \sin 7\theta + a_{72} \cos 7\theta \quad (45)$$

In this manner, the definition expression is changed in each quadrant by the coordinate movement by the quadrant determination unit 22. There is no need to perform any calculation processing because the function $\theta$ is not changed depending on the quadrant in the coordinates $(X_0, Y_0)$ in the first embodiment. However, when the definition expression is changed in each quadrant in the coordinates $(X_0, Y_0)$, there is a need to perform calculation processing depending on the change of the definition expression. Next, the relation between the definition expression and the rotation calculation of each component will be described. The relation is similar to that of the first embodiment. Only the case where the coordinates $(X_0, Y_0)$ of the 2-phase counter electromotive voltage are positioned in the first quadrant will now be described. Expressions in the case where the coordinates $(X_0, Y_0)$ of the 2-phase counter electromotive voltage are positioned in the second to fourth quadrants are similarly obtained based on changed definition expressions. Relational expressions shown in definition expressions (41) to (46) when the coordinates $(X_0, Y_0)$ of the 2-phase counter electromotive voltage are positioned in the first quadrant are obtained. Further, when the relational expression of Expression (46) is transformed, the relational expression shown in Expression (47) is obtained.

$$\frac{Y}{X} = \frac{a_1\sin\theta - a_{21}\sin2\theta + a_{22}\cos2\theta - a_{51}\sin5\theta + a_{52}\cos5\theta + a_{71}\sin7\theta - a_{72}\cos7\theta}{a_1\cos\theta + a_{21}\cos2\theta + a_{22}\sin2\theta + a_{51}\cos5\theta + a_{52}\sin5\theta + a_{71}\cos7\theta + a_{72}\sin7\theta} \quad (46)$$

$$-a_1 X\sin\theta + a_1 Y\cos\theta + a_{21}X\sin2\theta + a_{21}Y\cos2\theta - a_{22}X\cos2\theta + a_{22}Y\sin2\theta + a_{51}X\sin5\theta + a_{51}Y\cos5\theta - a_{52}X\cos5\theta + a_{52}Y\sin5\theta - a_{71}X\sin7\theta + a_{71}Y\cos7\theta + a_{72}X\cos7\theta + a_{72}Y\sin7\theta = 0 \quad (47)$$

The relation between the relational expression (47) obtained from the definition expression and the rotation calculation of each component will be described. A first term and a second term $(-a_1 X \sin\theta + a_1 Y \cos\theta)$ on the left-hand side of Expression (47) match the result $Y_{out1}$ of the Y-coordinate when $a\theta$ rightward rotation calculation (Expression (48)) is performed on coordinates $(a_1 X, a_1 Y)$.

$$\begin{pmatrix} X_{out1} \\ Y_{out1} \end{pmatrix} = \begin{pmatrix} \cos\theta & \sin\theta \\ -\sin\theta & \cos\theta \end{pmatrix} \begin{pmatrix} a_1 X \\ a_1 Y \end{pmatrix} \quad (48)$$

A third term and a fourth term ($a_{21}X \sin 2\theta + a_{21}Y \cos 2\theta$) on the left-hand side of Expression (47) match a result $Y_{out21}$ of the Y-coordinate when a $2\theta$ leftward rotation calculation (Expression (49)) is performed on coordinates ($a_{21}X$, $a_{21}Y$).

$$\begin{pmatrix} X_{out21} \\ Y_{out21} \end{pmatrix} = \begin{pmatrix} \cos 2\theta & -\sin 2\theta \\ \sin 2\theta & \cos 2\theta \end{pmatrix} \begin{pmatrix} a_{21} X \\ a_{21} Y \end{pmatrix} \quad (49)$$

A fifth term and a sixth term ($-a_{22}X \cos 2\theta + a_{22}Y \sin 2\theta$) on the left-hand side of Expression (47) match $-X_{out22}$ obtained by reversing the sign of the result of the X-coordinate when a $2\theta$ leftward rotation calculation (Expression (50)) is performed on coordinates ($a_{22}X$, $a_{22}Y$).

$$\begin{pmatrix} X_{out22} \\ Y_{out22} \end{pmatrix} = \begin{pmatrix} \cos 2\theta & -\sin 2\theta \\ \sin 2\theta & \cos 2\theta \end{pmatrix} \begin{pmatrix} a_{22} X \\ a_{22} Y \end{pmatrix} \quad (50)$$

A seventh term and an eighth term ($a_{51}X \sin 5\theta + a_{51}Y \cos 5\theta$) on the left-hand side of Expression (47) match a result $Y_{out51}$ of the Y-coordinate when a $5\theta$ leftward rotation calculation (Expression (51)) is performed on coordinates ($a_{51}X$, $a_{51}Y$).

$$\begin{pmatrix} X_{out51} \\ Y_{out51} \end{pmatrix} = \begin{pmatrix} \cos 5\theta & -\sin 5\theta \\ \sin 5\theta & \cos 5\theta \end{pmatrix} \begin{pmatrix} a_{51} X \\ a_{51} Y \end{pmatrix} \quad (51)$$

A ninth term and a tenth term ($-a_{52}X \cos 5\theta + a_{52}Y \sin 5\theta$) on the left-hand side of Expression (47) match $-X_{out52}$ obtained by reversing the sign of the result of the X-coordinate when a $5\theta$ leftward rotation calculation (Expression (52)) is performed on coordinates ($a_{52}X$, $a_{52}Y$).

$$\begin{pmatrix} X_{out52} \\ Y_{out52} \end{pmatrix} = \begin{pmatrix} \cos 5\theta & -\sin 5\theta \\ \sin 5\theta & \cos 5\theta \end{pmatrix} \begin{pmatrix} a_{52} X \\ a_{52} Y \end{pmatrix} \quad (52)$$

A eleventh term and a twelfth term ($-a_{71}X \sin 7\theta + a_{71}Y \cos 7\theta$) on the left-hand side of Expression (47) match a result $Y_{out71}$ of the Y-coordinate when a $7\theta$ rightward rotation calculation (Expression (53)) is performed on coordinates ($a_{71}X$, $a_{71}Y$).

$$\begin{pmatrix} X_{out71} \\ Y_{out71} \end{pmatrix} = \begin{pmatrix} \cos 7\theta & \sin 7\theta \\ -\sin 7\theta & \cos 7\theta \end{pmatrix} \begin{pmatrix} a_{71} X \\ a_{71} Y \end{pmatrix} \quad (53)$$

A thirteenth term and a fourteenth term ($a_{72}X \cos 7\theta + a_{72}Y \sin 7\theta$) on the left-hand side of Expression (47) match a result $X_{out72}$ of the X-coordinate when a $7\theta$ leftward rotation calculation (Expression (54)) is performed on coordinates ($a_{72}X$, $a_{72}Y$).

$$\begin{pmatrix} X_{out72} \\ Y_{out72} \end{pmatrix} = \begin{pmatrix} \cos 7\theta & \sin 7\theta \\ -\sin 7\theta & \cos 7\theta \end{pmatrix} \begin{pmatrix} a_{72} X \\ a_{72} Y \end{pmatrix} \quad (54)$$

Accordingly, Expression (47) is expressed by Expression (55).

$$Y_{out1} + Y_{out21} - X_{out22} + Y_{out51} - X_{out52} + Y_{out71} + X_{out72} = 0 \quad (55)$$

Like in the first embodiment, $\theta$ which satisfies the expression shown in Expression (55) is obtained by repeatedly performing the iterative rotation calculation including harmonic components and the rotation direction judgment. FIG. 15 illustrates a table showing the reference direction $\delta_{def}$ of the rotation calculation for components of each order and elements of the rotation direction discriminant by using the correlation between the relational expressions and the rotation calculations for each component. FIG. 15 illustrates results of obtaining the reference direction $\delta_{def}$ of the rotation calculation for components of each order and elements of the rotation direction discriminant when the coordinates ($X_0$, $Y_0$) of the 2-phase counter electromotive voltage are positioned in the second to fourth quadrants. As shown in the table, in the CORDIC calculation processing in which harmonics are taken into consideration, the calculation is performed depending on the quadrant in the coordinates ($X_0$, $Y_0$).

Figure 16:
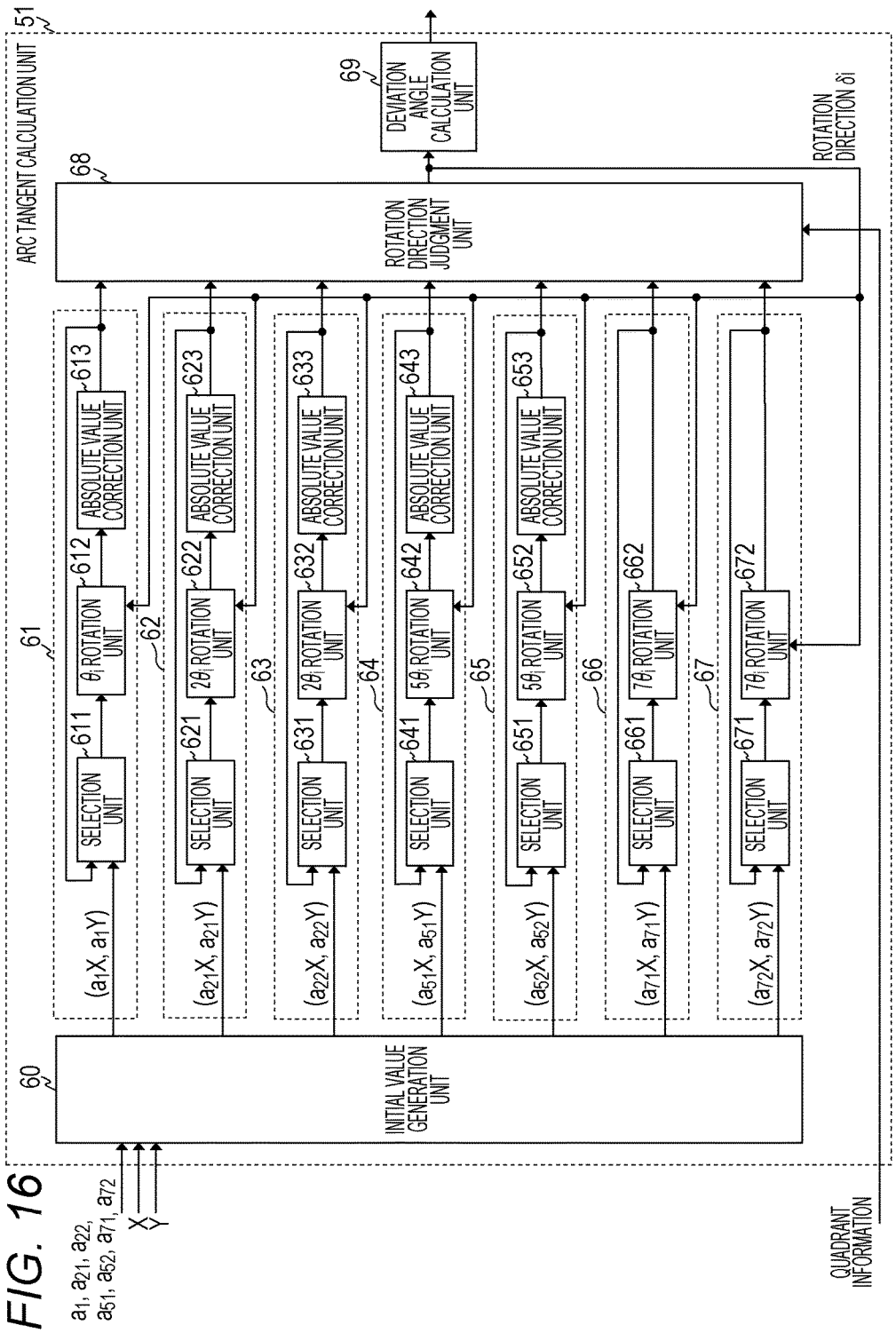
FIG. 16 is a diagram illustrating a configuration of an arc tangent calculation unit in consideration of harmonics according to the second embodiment.

Next, the configuration of the arc tangent calculation unit 51 in which harmonics are taken into consideration will be described with reference to FIG. 16. The initial value generation unit 60 generates an initial value for the rotation calculation for each component. Rotation calculation selection units 611, 621, 631, 641, 651, 661, and 671 for each component select the initial value when in the first iterative rotation calculation, and select the result of the previous operation in the second and subsequent iterative rotation calculations. Rotation calculation units 612, 622, 632, 642, 652, 662, and 672 of each component execute rotation calculations according to the iterative rotation calculation number "i" shown in Expressions (56) to (62), respectively. The rotation calculation unit 612 of the fundamental wave component performs a rotation calculation shown in Expression (56). The rotation calculation unit 622 of the second-order harmonic first term component performs a rotation calculation shown in Expression (57). The rotation calculation unit 632 for the second-order harmonic second term component performs a rotation calculation shown in Expression (58). The rotation calculation unit 642 for the fifth-order harmonic first term component performs a rotation calculation shown in Expression (59). The rotation calculation unit 652 for the fifth-order harmonic second term component performs a rotation calculation shown in Expression (60). The rotation calculation unit 662 for the seventh-order harmonic first term component performs a rotation calculation shown in Expression (61). The rotation calculation unit 672 for the seventh-order harmonic second term component performs a rotation calculation shown in Expression (62).

$$\begin{pmatrix} x_{1\_i} \\ y_{1\_i} \end{pmatrix} = \begin{pmatrix} 1 & -\delta_{def1}\delta_i 2^{-i} \\ \delta_{def1}\delta_i 2^{-i} & 1 \end{pmatrix} \begin{pmatrix} x_{1\_i-1} \\ y_{1\_i-1} \end{pmatrix} \quad (56)$$

$$\begin{pmatrix} x_{21\_i} \\ y_{21\_i} \end{pmatrix} = \begin{pmatrix} 1 & -\delta_{def21}\delta_i 2^{-i} \\ \delta_{def21}\delta_i 2^{-i} & 1 \end{pmatrix} \begin{pmatrix} x_{21\_i-1} \\ y_{21\_i-1} \end{pmatrix} \quad (57)$$

$$\begin{pmatrix} x_{22\_i} \\ y_{22\_i} \end{pmatrix} = \begin{pmatrix} 1 & -\delta_{def22}\delta_i 2^{-i} \\ \delta_{def22}\delta_i 2^{-i} & 1 \end{pmatrix} \begin{pmatrix} x_{22\_i-1} \\ y_{22\_i-1} \end{pmatrix} \quad (58)$$

$$\begin{pmatrix} x_{51\_i} \\ y_{51\_i} \end{pmatrix} = \begin{pmatrix} 1 & -\delta_{def51}\delta_i 2^{-i} \\ \delta_{def51}\delta_i 2^{-i} & 1 \end{pmatrix} \begin{pmatrix} x_{51\_i-1} \\ y_{51\_i-1} \end{pmatrix} \quad (59)$$

-continued $$\begin{pmatrix} x_{52\_i} \\ y_{52\_i} \end{pmatrix} = \begin{pmatrix} 1 & -\delta_{def52}\delta_i 2^{-i} \\ \delta_{def52}\delta_i 2^{-i} & 1 \end{pmatrix} \begin{pmatrix} x_{52\_i-1} \\ y_{52\_i-1} \end{pmatrix} \quad (60)$$

$$\begin{pmatrix} x_{71\_i} \\ y_{71\_i} \end{pmatrix} = \begin{pmatrix} 1 & -\delta_{def71}\delta_i 2^{-i} \\ \delta_{def71}\delta_i 2^{-i} & 1 \end{pmatrix} \begin{pmatrix} x_{71\_i-1} \\ y_{71\_i-1} \end{pmatrix} \quad (61)$$

$$\begin{pmatrix} x_{72\_i} \\ y_{72\_i} \end{pmatrix} = \begin{pmatrix} 1 & -\delta_{def72}\delta_i 2^{-i} \\ \delta_{def72}\delta_i 2^{-i} & 1 \end{pmatrix} \begin{pmatrix} x_{72\_i-1} \\ y_{72\_i-1} \end{pmatrix} \quad (62)$$

The absolute value correction units 613, 623, 633, 643, and 653 each correct an absolute value difference due to a difference between the rotation calculation numbers of the 7θi rotation calculation units 662 and 672 for the seventh-order harmonic component. Specifically, the absolute value correction unit 613 for the fundamental wave component carries out the operation shown in Expression (63) six times. The absolute value correction unit 623 for the second-order harmonic first term component and the absolute value correction unit 633 for the second-order harmonic second term component carry out the operations shown in Expressions (64) and (65) five times.

$$\begin{pmatrix} x_{1\_out} \\ y_{1\_out} \end{pmatrix} = C_i^6 \begin{pmatrix} x_{1\_in} \\ y_{1\_in} \end{pmatrix} \quad (63)$$

$$\begin{pmatrix} x_{21\_out} \\ y_{21\_out} \end{pmatrix} = C_i^5 \begin{pmatrix} x_{21\_in} \\ y_{21\_in} \end{pmatrix} \quad (64)$$

$$\begin{pmatrix} x_{22\_out} \\ y_{22\_out} \end{pmatrix} = C_i^5 \begin{pmatrix} x_{22\_in} \\ y_{22\_in} \end{pmatrix} \quad (65)$$

The absolute value correction unit 643 for the fifth-order harmonic first term component and the absolute value correction unit 653 for the fifth-order harmonic second term component carry out the operations shown in Expression (66) and (67) twice.

$$\begin{pmatrix} x_{51\_out} \\ y_{51\_out} \end{pmatrix} = C_i^2 \begin{pmatrix} x_{51\_in} \\ y_{51\_in} \end{pmatrix} \quad (66)$$

$$\begin{pmatrix} x_{52\_out} \\ y_{52\_out} \end{pmatrix} = C_i^2 \begin{pmatrix} x_{52\_in} \\ y_{52\_in} \end{pmatrix} \quad (67)$$

The correction coefficient $C_i$ in the first rotation calculation is shown in the above-mentioned Expression (30). The rotation direction judgment unit 68 determines the rotation direction $\delta_i$ of the subsequent rotation calculation by using the results of the rotation calculation units 61 to 67 for each component. The rotation direction judgment unit 68 changes the discriminant (judgment method) for the rotation direction depending on the quadrant in the coordinates $(X_0, Y_0)$ determined by the quadrant determination unit 22. The discriminants for each quadrant are illustrated in FIG. 15. The rotation calculation for each component and the rotation direction judgment are executed by the final iterative calculation number m, thereby obtaining the rotation coordinate data that converges to the relational expression derived from the definition expression, and a $\delta_i$ data stream (data history) as the rotation angle information. As the last operation process, the deviation angle calculation unit 69 performs the operation shown in Expression (37) illustrated in the first embodiment on the $\delta_i$ data stream, thereby obtaining the angle of deviation θ which is formed by the fundamental wave component and obtained by eliminating harmonic components. As described above, the arc tangent calculation unit 51 performs the arc tangent calculation in which harmonic components are taken into consideration.

Figure 17A:
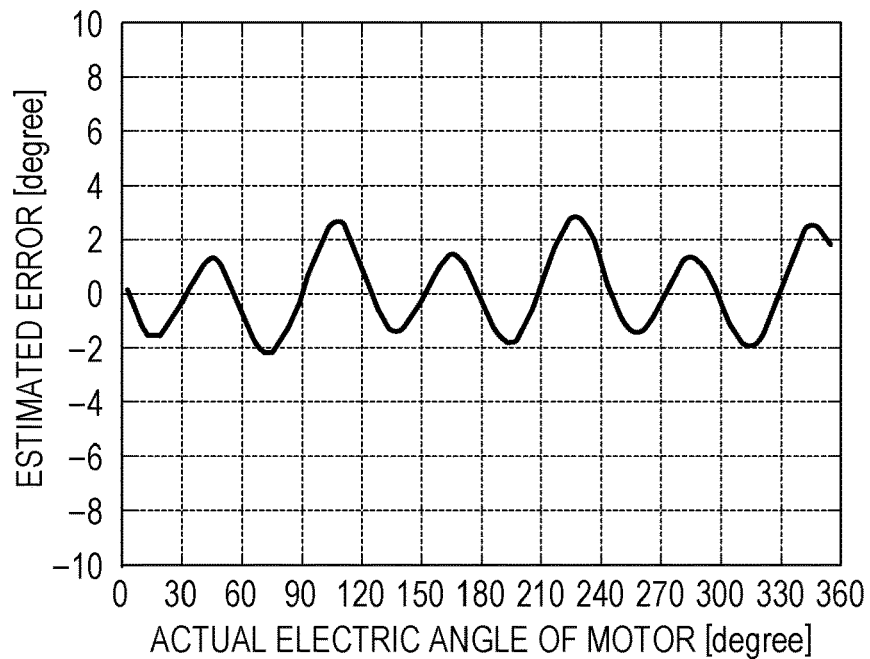
FIGS. 17A and 17B are graphs each illustrating an estimation error.
Figure 17B:
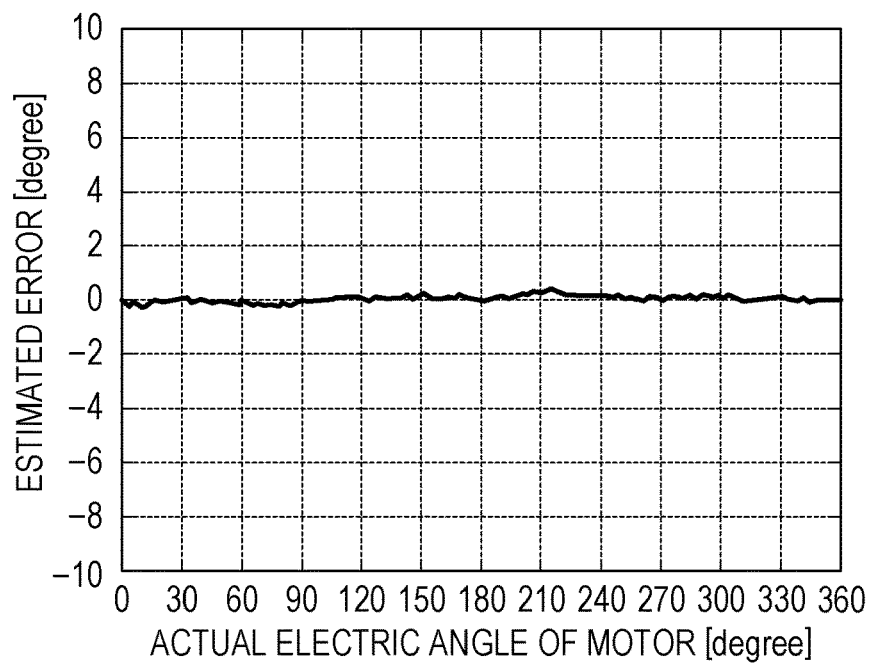

Next, advantageous effects of the arc tangent calculation in which harmonics are taken into consideration in the configuration illustrated in FIG. 16 will be described. FIG. 17A illustrates an estimation error when the position of a 2-phase counter electromotive voltage signal illustrated in FIG. 14A is estimated using a normal CORDIC calculation based on the fundamental wave. FIG. 17B illustrates an estimation error when the position estimation using the CORDIC calculation in which harmonics are taken into consideration according to this embodiment is performed. The detected error is about ±2.52[deg] in the operation illustrated in FIG. 17A. The detected error in the operation illustrated in FIG. 17B according to this embodiment is about ±0.30[deg]. Thus, the detected error is drastically reduced. Note that the intensity information about each component is calculated assuming that $a_1$ is 1.75; $a_{21}$ is −0.008; $a_{22}$ is −0.021; $a_{55}$ is −0.078; $a_{52}$ is −0.002; $a_{71}$ is −0.023; and $a_{72}$ is 0.001. Thus, an error in the estimation of the magnetic pole position of the motor 41 is reduced, thereby enabling a reduction in a speed error calculated by the estimated magnetic pole position. Since the motor 41 can be driven and controlled based on the accurate position and speed with a less error, a reduction in the rotational unevenness of the motor 41, a reduction in vibration and noise, and an improvement in efficiency can be achieved.

Note that this embodiment illustrates the CORDIC calculation in which harmonics are taken into consideration by defining the 2-phase counter electromotive voltage as Expression (40) in which the second, fifth, and seventh harmonic components are taken into consideration. However, harmonic components of other orders may also be taken into consideration, as needed. FIG. 18 is a table illustrating the reference rotation direction $\delta_{def}$ and elements of the rotation discriminant by generalizing the expression for the 2-phase counter electromotive voltage as shown in Expression (68). The table illustrated in FIG. 18 is a table used when the rotational movement is employed as a coordinate movement method when the coordinates $(X_0, Y_0)$ are positioned in the second to fourth quadrants.

$$X_0 = \sum_{n=1}^{\infty} (\pm a_{n1}\cos n\theta_0 \pm a_{n2}\sin n\theta_0) \quad (68)$$

$$Y_0 = \sum_{n=1}^{\infty} (\pm a_{n1}\sin n\theta_0 \pm a_{n2}\cos n\theta_0)$$

A term including $a_{n1}$ is referred to as a first term component, and a term including $a_{n2}$ is referred to as a second term component. The signs of these terms are generalized by "±". Further, n represents the order of a harmonic. The elements of the rotation discriminant vary depending on a remainder (mod (n, 4)) obtained after dividing the order n by 4. Also when a 2-phase signal is represented by any definition expression, an error in the arc tangent calculation due to harmonics of the 2-phase signal can be reduced by performing operation processing corresponding to the table illustrated in FIG. 18.

Third Embodiment

A third embodiment of the present disclosure illustrates a case where a symmetrical movement is employed instead of a rotational movement, as a coordinate movement method in the quadrant determination unit of the position estimation unit when the coordinates $(X_0, Y_0)$ of the 2-phase counter electromotive voltage are positioned in the second to fourth quadrants. When the coordinate movement method is changed, the way how the definition expression is changed is also changed. In this embodiment, CORDIC calculation processing in which harmonics are taken into consideration may be performed based on a changed definition expression, like in the second embodiment.

Similarly to the second embodiment, a motor control apparatus of a 3-phase brushless motor according to this embodiment will be described below. The definition expression for the 2-phase counter electromotive voltage is also similar to that of the second embodiment. In this embodiment, the coordinate movement by the symmetrical movement, which is a feature different from the second embodiment, and changing of the definition expression for the 2-phase counter electromotive voltage when the coordinate movement is performed by the symmetrical movement are described.

First, the quadrant determination unit 22 and the angle conversion unit 24 according to the third embodiment will be described. The quadrant determination unit 22 determines a quadrant in which the coordinates $(X_0, Y_0)$ of the 2-phase counter electromotive voltage are positioned, and moves the coordinates to the first quadrant when the coordinates are positioned in the second to fourth quadrants. In this embodiment, the symmetrical movement is employed as a coordinate movement method. First, when the coordinates $(X_0, Y_0)$ are positioned in the first quadrant, the quadrant determination unit 22 does not perform the coordinate movement. The coordinates $(X, Y)$ input to the arc tangent calculation unit 51 indicate the same values as those of the 2-phase counter electromotive voltage $(X_0, Y_0)$ as shown in Expression (5). As shown in Expression (6), the angle conversion unit 24 directly outputs the arc tangent calculation result $\theta$ as the magnetic pole position $\theta_0$.

Figure 19A:
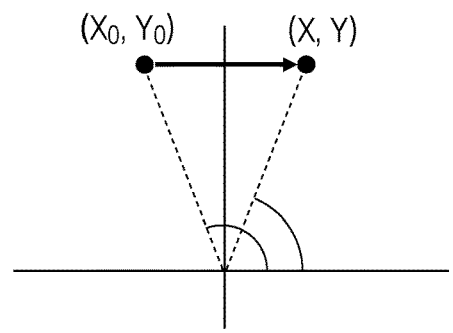
FIGS. 19A to 19C are graphs each illustrating a symmetrical movement.

Next, a case where the coordinates $(X_0, Y_0)$ are positioned in the second quadrant will be described. When $X_0<0$ and $Y_0\geq0$, the quadrant determination unit 22 determines that the coordinates are positioned in the second quadrant, and converts the coordinates from the coordinates $(X_0, Y_0)$ to the coordinates $(X, Y)$ in the first quadrant by a symmetrical movement with respect to a y-axis as shown in Expression (69). FIG. 19A illustrates the coordinate movement. The original angle $\theta_0$ is converted to $\theta$ as shown in Expression (70). The arc tangent calculation unit 51 obtains the angle $\theta$ by using $(X, Y)$ as input coordinates. Lastly, the angle conversion unit 24 obtains the original angle $\theta_0$ by subtracting the arc tangent calculation result $\theta$ from 180 degrees as shown in Expression (71) and outputs the original angle $\theta_0$ thus obtained.

$$\begin{pmatrix} X \\ Y \end{pmatrix} = \begin{pmatrix} -1 & 0 \\ 0 & 1 \end{pmatrix}\begin{pmatrix} X_0 \\ Y_0 \end{pmatrix} = \begin{pmatrix} -X_0 \\ Y_0 \end{pmatrix} \tag{69}$$

$$\theta = 180 - \theta_0 \tag{70}$$

$$\theta_0 = 180 - \theta \tag{71}$$

Figure 19B:
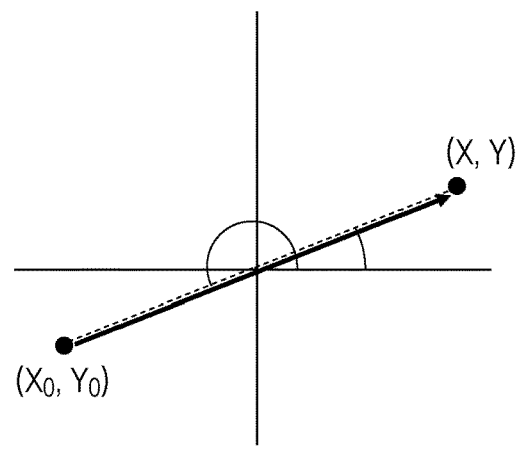

Next, when the coordinates $(X_0, Y_0)$ satisfy $X_0<0$ and $Y_0<0$, the quadrant determination unit 22 determines that the coordinates are positioned in the third quadrant, and moves the coordinates to the first quadrant by the symmetrical movement with respect to an origin as shown in Expression (72). FIG. 19B illustrates the coordinate movement. The original angle $\theta_0$ is converted to $\theta$ as shown in Expression (73). The arc tangent calculation unit 51 obtains the angle $\theta$ by using $(X, Y)$ as input coordinates. Lastly, the angle conversion unit 24 obtains the original angle $\theta_0$ by Expression (74) and outputs the original angle $\theta_0$ thus obtained.

$$\begin{pmatrix} X \\ Y \end{pmatrix} = \begin{pmatrix} -1 & 0 \\ 0 & -1 \end{pmatrix}\begin{pmatrix} X_0 \\ Y_0 \end{pmatrix} = \begin{pmatrix} -X_0 \\ -Y_0 \end{pmatrix} \tag{72}$$

$$\theta = \theta_0 - 180 \tag{73}$$

$$\theta_0 = \theta + 180 \tag{74}$$

Figure 19C:
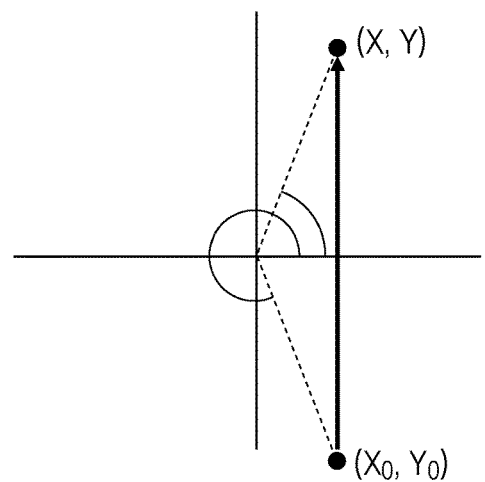

Next, when the coordinates $(X_0, Y_0)$ satisfy $X_0\geq0$ and $Y_0<0$, the quadrant determination unit 22 determines that the coordinates are positioned in the fourth quadrant, and moves the coordinates to the first quadrant by the symmetrical movement with respect to an X-axis as shown in Expression (75). FIG. 19C illustrates the coordinate movement. The original angle $\theta_0$ is converted to $\theta$ as shown in Expression (76). The arc tangent calculation unit 51 obtains the angle $\theta$ by using $(X, Y)$ as input coordinates. Lastly, the angle conversion unit 24 obtains the original angle $\theta_0$ by Expression (77) and outputs the original angle $\theta_0$ thus obtained.

$$\begin{pmatrix} X \\ Y \end{pmatrix} = \begin{pmatrix} 1 & 0 \\ 0 & -1 \end{pmatrix}\begin{pmatrix} X_0 \\ Y_0 \end{pmatrix} = \begin{pmatrix} X_0 \\ -Y_0 \end{pmatrix} \tag{75}$$

$$\theta = 360 - \theta_0 \tag{76}$$

$$\theta_0 = 360 - \theta \tag{77}$$

The angle $\theta_0$ can be obtained by the processing described above. Next, changing of the definition expression when the coordinate movement is performed will be described. A 2-phase counter electromotive voltage waveform of the 3-phase brushless motor is represented by the definition expression shown in Expression (40), like in the second embodiment. First, a case where the coordinates $(X_0, Y_0)$ of the 2-phase counter electromotive voltage are positioned in the first quadrant will be described. As shown in Expressions (5) and (6), the quadrant determination unit 22 does not perform the coordinate move, the functions $X(\theta)$ and $Y(\theta)$ are expressed by Expression (78).

$X=a_1 \cos \theta + a_{21} \cos 2\theta + a_{22} \sin 2\theta + a_{51} \cos 5\theta + a_{52} \sin 5\theta + a_{71} \cos 7\theta + a_{72} \sin 7\theta$ $Y=a_1 \sin \theta - a_{21} \sin 2\theta + a_2 \cos 2\theta - a_{51} \sin 5\theta + a_{52} \cos 5\theta + a_{71} \sin 7\theta - a_{72} \cos 7\theta$ (78)

Next, a case where the coordinates $(X_0, Y_0)$ of the 2-phase counter electromotive voltage are positioned in the second quadrant will be described. The functions $X(\theta)$ and $Y(\theta)$ shown in Expression (79) are obtained by performing transform processing by the symmetrical movement as shown in Expressions (69) to (77). The functions in the Expression (79) are different from those in the Expression (78).

$X=a_1 \cos \theta - a_{21} \cos 2\theta + a_{22} \sin 2\theta + a_{51} \cos 5\theta - a_{52} \sin 5\theta + a_{71} \cos 7\theta - a_{72} \sin 7\theta$ $Y=a_1 \sin \theta + a_{21} \sin 2\theta + a_{22} \cos 2\theta - a_{51} \sin 5\theta - a_{52} \cos 5\theta + a_{71} \sin 7\theta + a_{72} \cos 7\theta$ (79)

Similarly, when the coordinates $(X_0, Y_0)$ of the 2-phase counter electromotive voltage are positioned in the third quadrant and when the coordinates are positioned in the fourth quadrant, the functions X(θ) and Y(θ) shown in Expressions (80) and (81) are obtained by the symmetrical movement.

$$X = a_1 \cos\theta - a_{21} \cos 2\theta - a_{22} \sin 2\theta + a_{51} \cos 5\theta + a_{52} \sin 5\theta + a_{71} \cos 7\theta + a_{72} \sin 7\theta$$

$$Y = a_1 \sin\theta + a_{21} \sin 2\theta - a_{22} \cos 2\theta - a_{51} \sin 5\theta + a_{52} \cos 5\theta + a_{71} \sin 7\theta - a_{72} \cos 7\theta \quad (80)$$

$$X = a_1 \cos\theta + a_{21} \cos 2\theta - a_{22} \sin 2\theta + a_{51} \cos 5\theta - a_{52} \sin 5\theta + a_{71} \cos 7\theta -_{a72} \sin 7\theta$$

$$Y = a_1 \sin\theta - a_{21} \sin 2\theta - a_{22} \cos 2\theta - a_{51} \sin 5\theta - a_{52} \cos 5\theta + a_{71} \sin 7\theta + a_{72} \cos 7\theta \quad (81)$$

Thus, the definition expression is changed by the coordinate movement by the symmetrical movement of the quadrant determination unit 22. The definition expression is changed by the rotational movement also in the second embodiment. However, the way how the definition expression is changed by the symmetrical movement according to this embodiment is different from that in the second embodiment. In this embodiment, CORDIC calculation processing in which harmonics are taken into consideration may be performed based on the changed definition expression, like in the second embodiment. FIG. 20 is a table illustrating elements of the rotation direction discriminant for components of each order. The CORDIC calculation in which harmonics are taken into consideration is similar to that illustrated in FIG. 16 in the second embodiment. In this embodiment, the calculation is performed by changing the rotation direction discriminant for each quadrant as illustrated in FIG. 20, thereby obtaining the same advantageous effects as those of the second embodiment. The results as illustrated in FIGS. 17A and 17B according to this embodiment are similar to those of the second embodiment. As described above, even when the coordinate movement is performed by the symmetrical movement when the coordinates of the counter electromotive voltage are positioned in the second to fourth quadrants, the harmonic CORDIC calculation is performed based on the definition expression changed by the coordinate movement, thereby drastically reducing the position estimation error.

This embodiment illustrates a case where the symmetrical movement is employed by using the 3-phase brushless motor by way of example. However, also in the 2-phase stepping motor, a reduction in position estimation error can be achieved by performing the calculation based on a change of the definition expression by employing the symmetrical movement. This embodiment illustrates the CORDIC calculation in which harmonics are taken into consideration by defining the 2-phase counter electromotive voltage as Expression (40) in which the second, fifth, and seventh harmonic components are taken into consideration. However, harmonic components of other orders may also be taken into consideration, as needed. FIG. 21 is a table illustrating the reference rotation direction $\delta_{def}$ and elements of the rotation discriminant by generalizing the 2-phase counter electromotive voltage as shown in Expression (68) as described above in the last section of the second embodiment. The table illustrated in FIG. 21 is a table used when the symmetrical movement is employed as a coordinate movement method when the coordinates $(X_0, Y_0)$ are positioned in the second to fourth quadrants. Also when a 2-phase signal is represented by any definition expression, an error in the arc tangent calculation due to harmonics of the 2-phase signal can be reduced by performing operation processing corresponding to the table illustrated in FIG. 21.

A fourth embodiment of the present disclosure illustrates another configuration of the arc tangent calculation in which harmonics are taken into consideration. In the first to third embodiments, calculation is performed by including the intensity information and coordinate information in the initial value obtained before rotation calculation. On the other hand, in this embodiment, calculation is performed without including the intensity information and coordinate information in the initial value for rotation calculation, but instead the intensity information and coordinate information are included in the rotation direction judgment unit. As a rotation direction discriminant, an expression obtained in the same manner as in the first to third embodiments is used, and θ which satisfies a relational expression based on the definition expression is searched by iterative rotation calculation, like in the above embodiments. Similarly to the first embodiment, in this embodiment, a motor control apparatus of a 2-phase stepping motor is used. Also the definition expression for the 2-phase counter electromotive voltage is described as Expression (19), like in the first embodiment. The relational expression is represented by Expression (22), like in the first embodiment. Similarly to the first embodiment, in this embodiment, θ which satisfies the relational expression is obtained. Features of the fourth embodiment that are different from those of the first embodiment in the configuration for the arc tangent calculation in which harmonics are taken into consideration will be described below.

Figure 22:
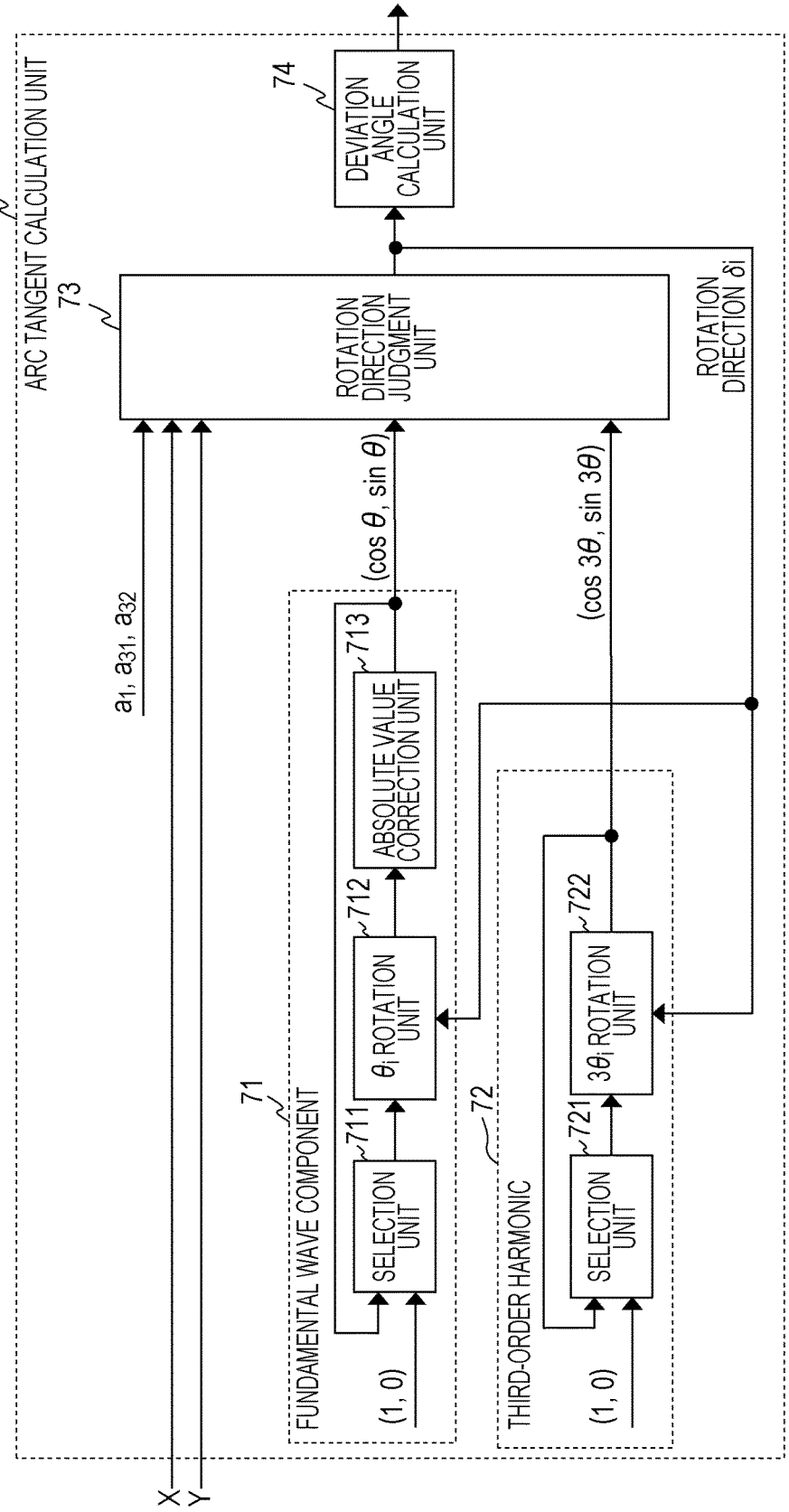
FIG. 22 is a diagram illustrating a configuration of an arc tangent calculation unit in consideration of harmonics according to a fourth embodiment.

FIG. 22 is a diagram illustrating a configuration of the arc tangent calculation unit 23 in which harmonics are taken into consideration according to the fourth embodiment. Each unit will be described. First, a rotation calculation unit 71 for the fundamental wave component will be described. The rotation calculation unit 71 for the fundamental wave component includes a selection unit 711, a θi rotation unit 712, and an absolute value correction unit 713. The selection unit 711 selects input coordinates to be supplied to the rotation unit 712 in the subsequent stage. Specifically, the selection unit 711 selects the initial value (1, 0) in the first iterative calculation, and selects the previous result of the rotation calculation unit 71 for the fundamental wave component in the second and subsequent iterative calculations. The θi rotation unit 712 has a feature in performing the CORDIC rotation calculation, and performs a rotation calculation shown in Expression (82), like the rotation calculation unit for the fundamental wave component according to the first embodiment.

$$\begin{pmatrix} x_{1\_i} \\ y_{1\_i} \end{pmatrix} = \begin{pmatrix} 1 & -\delta_i 2^{-i} \\ \delta_i 2^{-i} & 1 \end{pmatrix} \begin{pmatrix} x_{1\_i-1} \\ y_{1\_i-1} \end{pmatrix} \quad (82)$$

Similarly to the first embodiment, the absolute value correction unit 713 corrects an absolute value difference due to a difference (=2 times) between the rotation calculation numbers of the θi rotation unit 712 and the 3θi rotation unit 722 for the third-order harmonic component. Since the initial value for the first iterative calculation is (1, 0), the output of the rotation calculation unit 71 for the fundamental wave component corresponds to (cos θ, sin θ).

Next, a rotation calculation unit 72 of a third-order harmonic component will be described. The rotation calculation unit 72 for the third-order harmonic component includes a selection unit 721 and a 3θi rotation unit 722. The selection unit 721 selects input coordinates to be supplied to the rotation unit 722 in the subsequent stage. Specifically, the selection unit 721 selects the initial value (1, 0) in the first iterative calculation, and selects the previous result of the rotation calculation unit 72 for the third-order harmonic component in the second and subsequent iterative calculations. The 3θi rotation unit 722 has a feature in performing the CORDIC rotation calculation, and performs a rotation calculation shown in Expression (83), like the rotation calculation unit for the third-order harmonic component according to the first embodiment.

$$\begin{pmatrix} x_{3\_i} \\ y_{3\_i} \end{pmatrix} = \begin{pmatrix} 1 & -\delta_i 2^{-i} \\ \delta_i 2^{-i} & 1 \end{pmatrix} \begin{pmatrix} x_{3\_i-1} \\ y_{3\_i-1} \end{pmatrix} \quad (83)$$

Since the initial value in the first iterative calculation is (1, 0), the output of the rotation calculation unit 72 for the third-order harmonic component corresponds to (cos 3θ, sin 3θ). Next, the rotation direction judgment unit 73 will be described. The rotation direction judgment unit 73 determines the rotation direction $\delta_i$ of the subsequent rotation calculation based on the result (cos θ, sin θ) of the rotation calculation of the rotation calculation unit 71 for each component, the result (cos 3θ, sin 3θ) of the rotation calculation of the rotation calculation unit 72, intensity information $a_1$, $a_{31}$, and $a_{32}$, and coordinates (X, Y). In this case, the intensity information $a_1$ indicates the intensity of the fundamental wave of the counter electromotive voltage; the intensity information $a_{31}$ indicates the intensity of the third-order harmonic first term; and the intensity information $a_{32}$ indicates the intensity of the third-order harmonic second term. A discriminant for determining the rotation direction $\delta_i$ is expressed as Expression (84)

$$a_1 Y \cos \theta - a_1 X \sin \theta + a_{31} Y \cos 3\theta + a_{31} X \sin 3\theta + a_{32} Y \sin 3\theta - a_{32} X \cos 3\theta \geq 0 \quad (84)$$

The Expression (84) is the same as the discriminant according to the first embodiment. When Expression (84) is true, the rotation direction $\delta_i$ takes a value "1", and when Expression (84) is false, the rotation direction $\delta_i$ takes a value "−1". Thus, the discriminant includes the fundamental wave component and the third-order harmonic component. This indicates that a search for θ in which harmonics are taken into consideration is performed. As described above, the rotation direction $\delta_i$ is determined, thereby enabling execution of the subsequent iterative rotation calculation. The rotation calculation for each component and the rotation direction judgment are executed by the final iterative calculation number m, thereby obtaining the rotation coordinate data which converges to the relation expression (22) and the $\delta_i$ data stream (data history) as rotation angle information. Similarly to the first embodiment, as the last operation process, the deviation angle calculation unit 74 performs the calculation shown in Expression (37) on the $\delta_i$ data stream, thereby obtaining the angle of deviation θ that is formed by the fundamental wave component and obtained by eliminating harmonic components.

As described above, in this embodiment, the CORDIC calculation in which harmonics are taken into consideration is carried out based on the relation expression (22) derived from the definition expression (19) for an assumed waveform. The advantageous effect of reducing the position estimation error is similar to that of the first embodiment. FIG. 9A illustrates an estimation error when a normal CORDIC calculation in which harmonics are not taken into consideration is performed. FIG. 9B illustrates an estimation error when the CORDIC calculation in which harmonics are taken into consideration as illustrated in FIG. 22 is performed. Also in this embodiment, the position estimation error can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-125441, filed Jun. 24, 2016, which is hereby incorporated by reference herein in its entirety.

What is claimed is:

1. A motor control apparatus comprising:
   a motor including a rotor;
   a current detection unit configured to detect a current flowing through the motor;
   a position estimation unit configured to estimate a position of the rotor based on the current detected by the current detection unit; and
   a driving voltage generation unit configured to generate a voltage applied to the motor based on the position of the rotor estimated by the position estimation unit,
   wherein
   the position estimation unit includes:
   a counter electromotive voltage estimation unit configured to estimate a counter electromotive voltage generated in the motor based on the voltage generated by the driving voltage generation unit and the current detected by the current detection unit; and
   an arc tangent calculation unit configured to calculate an angle of deviation by performing an arc tangent calculation using coordinate data on a two-dimensional plane based on the counter electromotive voltage estimated by the counter electromotive voltage estimation unit, and
   the arc tangent calculation unit includes:
   a fundamental-wave rotation calculation unit configured to repeatedly perform a rotation calculation of coordinate data on a fundamental wave by gradually decreasing a rotation angle;
   a harmonic rotation calculation unit configured to repeatedly perform a rotation calculation of coordinate data on at least one harmonic by gradually decreasing the rotation angle;
   a rotation direction judgment unit configured to judge a rotation direction of a subsequent rotation calculation by the fundamental-wave rotation calculation unit and the harmonic rotation calculation unit based on a result of the rotation calculation by the fundamental-wave rotation calculation unit and a result of the rotation calculation by the harmonic rotation calculation unit; and
   a deviation angle calculation unit configured to calculate, as an angle of deviation of the fundamental wave, a total of rotation angles obtained as a result of the rotation calculation by the fundamental-wave rotation calculation unit.

2. The motor control apparatus according to claim 1, wherein the arc tangent calculation unit includes an absolute value correction unit configured to correct an absolute value of a result of the rotation calculation by one of the fundamental-wave rotation calculation unit and the harmonic rotation calculation unit in such a manner that a rate of change in the absolute value of a result of the rotation calculation by the fundamental-wave rotation calculation unit matches a rate of change in the absolute value of a result of the rotation calculation by the harmonic rotation calculation unit.

3. The motor control apparatus according to claim 2, wherein the absolute value correction unit performs a reciprocating rotation calculation when a difference between the fundamental wave and an order of the harmonic is a positive even number, the rotation calculation being a pair of a rotation calculation in a positive direction and a rotation calculation in a negative direction with the same rotation angle as that of the rotation angle of the rotation calculation in the positive direction.

4. The motor control apparatus according to claim 1, wherein
the position estimation unit includes:
a quadrant determination unit configured to determine a quadrant in which coordinate data on the counter electromotive voltage estimated by the counter electromotive voltage estimation unit is positioned, and generate coordinate data to be output to the arc tangent calculation unit by moving the coordinate data on the counter electromotive voltage according to the determined quadrant; and
an angle conversion unit configured to calculate an angle of deviation corresponding to the position of the rotor correcting the angle of deviation calculated by the arc tangent calculation unit according to the movement of the coordinate data by the quadrant determination unit, and
the rotation direction judgment unit changes a rotation direction judgment method according to the quadrant determined by the quadrant determination unit.

5. The motor control apparatus according to claim 1, wherein the rotation direction judgment unit judges the rotation direction based on results of the rotation calculations by the fundamental-wave rotation calculation unit and the harmonic rotation calculation unit, coordinate data, an intensity of a fundamental wave of the counter electromotive voltage, and an intensity of a harmonic.

6. The motor control apparatus according to claim 1, wherein the harmonic rotation calculation unit includes:
a first harmonic rotation calculation unit configured to perform a rotation calculation of coordinate data on a first term of the harmonic; and
a second harmonic rotation calculation unit configured to perform a rotation calculation of coordinate data on a second term of the harmonic.

7. The motor control apparatus according to claim 1, wherein the arc tangent calculation unit includes an initial value generation unit configured to output, to the fundamental-wave rotation calculation unit, an initial value of coordinate data on the fundamental wave based on coordinate data, an intensity of a fundamental wave of the counter electromotive voltage, and an intensity of a harmonic, and outputs, to the harmonic rotation calculation unit, an initial value of coordinate data on the harmonic.

8. The motor control apparatus according to claim 7, wherein an intensity of a fundamental wave of the counter electromotive voltage and an intensity of a harmonic are acquired by performing a Fourier transform on a waveform of the counter electromotive voltage estimated by the counter electromotive voltage estimation unit during driving of the motor.

9. The motor control apparatus according to claim 8, wherein the intensity of the fundamental wave of the counter electromotive voltage and the intensity of the harmonic are acquired during driving at a speed higher than a minimum speed among speeds of normal driving of the motor.

10. The motor control apparatus according to claim 8, wherein the intensity of the fundamental wave of the counter electromotive voltage and the intensity of the harmonic are acquired during driving at a load smaller than a maximum load among loads of normal driving of the motor.

11. The motor control apparatus according to claim 8, wherein the intensity of the fundamental wave of the counter electromotive voltage and the intensity of the harmonic are acquired during driving at an inertia larger than a minimum inertia among inertias of normal driving of the motor.

12. The motor control apparatus according to claim 8, further comprising a speed calculation unit configured to calculate a speed based on the position estimated by the position estimation unit, wherein
the driving voltage generation unit includes a speed control unit configured to perform speed control by comparing the speed calculated by the speed calculation unit with a target speed, and
the intensity of the fundamental wave of the counter electromotive voltage and the intensity of the harmonic are acquired during driving at a gain for the speed control that is smaller than a gain for the speed control during normal driving of the motor.

13. The motor control apparatus according to claim 8, further comprising a speed calculation unit configured to calculate a speed based on the position estimated by the position estimation unit, wherein
the driving voltage generation unit includes a speed control unit configured to perform speed control by comparing the speed calculated by the speed calculation unit with a target speed, and
the intensity of the fundamental wave of the counter electromotive voltage and the intensity of the harmonic are acquired in a state where a notch filter is inserted into a control loop of the speed control.

14. A control method for a motor control apparatus, the motor control apparatus comprising:
a rotor;
a current detection unit configured to detect a current flowing through the motor;
a position estimation unit configured to estimate a position of the rotor based on the current detected by the current detection unit; and
a driving voltage generation unit configured to generate a voltage to be applied to the motor based on the position of the rotor estimated by the position estimation unit,
the control method comprising:
a counter electromotive voltage estimation step of estimating, by the position estimation unit, a counter electromotive voltage generated in the motor based on the voltage generated by the driving voltage generation unit and the current detected by the current detection unit; and
an arc tangent calculation step of calculating, by the position estimation unit, an angle of deviation by performing an arc tangent calculation using coordinate data on a two-dimensional plane based on the counter electromotive voltage estimated in the counter electromotive voltage estimation step, wherein
the arc tangent calculation step includes:
a fundamental-wave rotation calculation step of repeatedly performing, by the position estimation unit, a rotation calculation of coordinate data on a fundamental wave while decreasing a rotation angle;

a harmonic rotation calculation step of repeatedly performing, by the position estimation unit, a rotation calculation of coordinate data on at least one or more harmonics while decreasing the rotation angle;

a rotation direction judgment step of judging, by the position estimation unit, a rotation direction of a subsequent rotation calculation in each of the fundamental-wave rotation calculation step and the harmonic rotation calculation step based on a result of the rotation calculation in the fundamental-wave rotation calculation step and a result of the rotation calculation in the harmonic rotation calculation step; and a deviation angle calculation step of calculating, by the position estimation unit, a total of rotation angles obtained as a result of the rotation calculation in the fundamental-wave rotation calculation step as an angle of deviation of the fundamental wave.

* * * * *